(12) United States Patent
Nagahiro et al.

(10) Patent No.: US 10,340,762 B2
(45) Date of Patent: Jul. 2, 2019

(54) STATOR FOR ELECTRIC ROTARY MACHINE AND METHOD FOR PRODUCING THE STATOR

(71) Applicant: HONDA MOTOR CO., LTD., Tokyo (JP)

(72) Inventors: Kentaro Nagahiro, Wako (JP); Tomotaka Iki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 15/301,117

(22) PCT Filed: Mar. 24, 2015

(86) PCT No.: PCT/JP2015/058916
§ 371 (c)(1),
(2) Date: Sep. 30, 2016

(87) PCT Pub. No.: WO2015/151931
PCT Pub. Date: Oct. 8, 2015

(65) Prior Publication Data
US 2017/0025913 A1 Jan. 26, 2017

(30) Foreign Application Priority Data

Mar. 31, 2014 (JP) .................................. 2014-072870
Mar. 31, 2014 (JP) .................................. 2014-072871

(51) Int. Cl.
*H02K 3/00* (2006.01)
*H02K 3/28* (2006.01)
(Continued)

(52) U.S. Cl.
CPC ................. *H02K 3/28* (2013.01); *H02K 1/16* (2013.01); *H02K 3/12* (2013.01); *H02K 3/32* (2013.01);
(Continued)

(58) Field of Classification Search
CPC ................................. H02K 3/522; H02K 3/50
(Continued)

(56) References Cited

U.S. PATENT DOCUMENTS 6,400,059 B1 * 6/2002 Hsu ..................... H02K 1/148
310/254.1
6,946,759 B2 * 9/2005 Asao ..................... H02K 3/50
310/45
(Continued)

FOREIGN PATENT DOCUMENTS

CN 102891547 A 1/2013
JP 2001-275288 A 10/2001
(Continued)

OTHER PUBLICATIONS

Office Action dated Apr. 11, 2018 issued in counterpart Chinese application No. 201580014533.8. (8 pages).
(Continued)

*Primary Examiner* — Alexander Talpalatski
(74) *Attorney, Agent, or Firm* — Westerman, Hattori, Daniels & Adrian, LLP

(57) ABSTRACT

A stator for an electric rotary machine including a stator core and a coil, wherein: the coil has plural slot coils and plural connection coils, each slot coil being inserted into the slot, each connection coil connecting the slot coils in a position lying further axially outwards than an axial end face of the stator core, and the coil being constituted in such a way that the slot coil and the connection coil are joined at an abutment portion; and in a hole portion, where the abutment portion is accommodated, of a insulation plate, the connection coil and the slot coil are spaced apart from the insulation plate in the circumferential direction to thereby form a first gap portion.

17 Claims, 24 Drawing Sheets

(51) Int. Cl.
*H02K 3/50* (2006.01)
*H02K 15/085* (2006.01)
*H02K 3/12* (2006.01)
*H02K 1/16* (2006.01)
*H02K 3/32* (2006.01)
*H02K 3/48* (2006.01)
*H02K 15/00* (2006.01)
*H02K 15/02* (2006.01)

(52) U.S. Cl.
CPC ................ *H02K 3/48* (2013.01); *H02K 3/50* (2013.01); *H02K 15/0068* (2013.01); *H02K 15/02* (2013.01); *H02K 15/085* (2013.01); *H02K 2213/03* (2013.01)

(58) Field of Classification Search
USPC ........................................................ 310/179
See application file for complete search history.

(56) References Cited

U.S. PATENT DOCUMENTS

| | | | | |
|---|---|---|---|---|
| 7,135,793 | B2* | 11/2006 | Seguchi | H02K 3/12 310/71 |
| 7,936,116 | B2* | 5/2011 | Asou | H02K 3/12 310/216.114 |
| 8,729,755 | B2* | 5/2014 | Nakagawa | H02K 3/522 310/68 R |
| 9,362,793 | B2* | 6/2016 | Iki | H02K 3/12 |
| 9,362,809 | B2* | 6/2016 | Kishi | H02K 3/12 |
| 2005/0253466 | A1* | 11/2005 | Seguchi | H02K 3/12 310/71 |
| 2009/0230808 | A1* | 9/2009 | Tatebe | H02K 3/12 310/201 |
| 2013/0020890 | A1 | 1/2013 | Iki et al. | |
| 2013/0020891 | A1* | 1/2013 | Kishi | H02K 3/12 310/71 |
| 2013/0020901 | A1 | 1/2013 | Kishi et al. | |
| 2015/0280503 | A1* | 10/2015 | Takahashi | H02K 3/12 310/201 |

FOREIGN PATENT DOCUMENTS

| | | |
|---|---|---|
| JP | 2005-328661 A | 11/2005 |
| JP | 2014-7781 A | 1/2014 |
| JP | 5389109 B2 | 1/2014 |

OTHER PUBLICATIONS

International Search Report dated Jun. 23, 2015, issued in counterpart International Application No. PCT/JP2015/058916 (1 page).

* cited by examiner

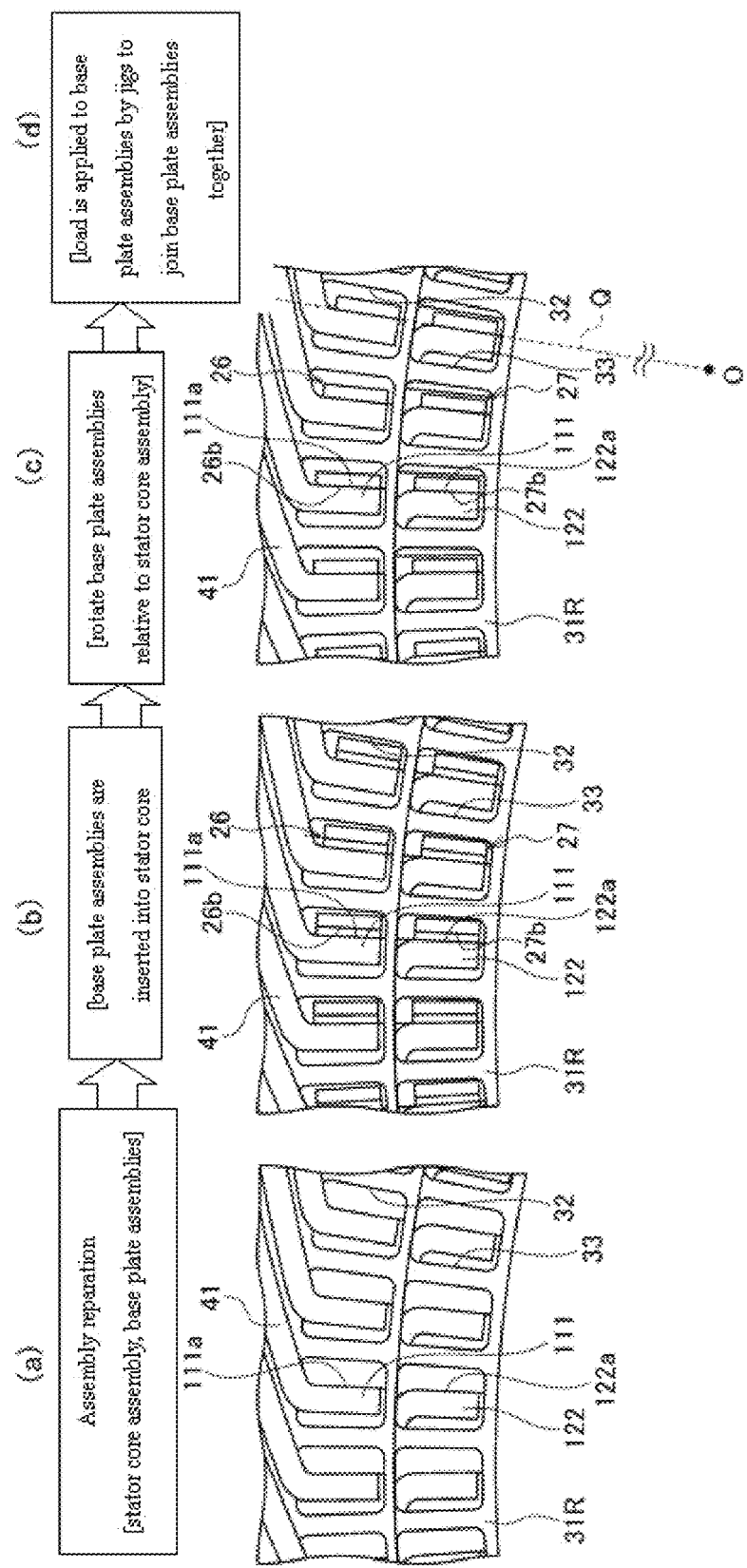

STATOR FOR ELECTRIC ROTARY MACHINE AND METHOD FOR PRODUCING THE STATOR

TECHNICAL FIELD

The present invention relates to a stator for an electric rotary machine that can be mounted on an electric vehicle, a hybrid vehicle and the like and a method for producing the stator.

BACKGROUND ART

There have conventionally be known stators of electric rotary machines in which coils are prepared by winding winding wires around teeth of a stator core. In the conventional electric rotary machines in which the coils are prepared by winding the winding wires around the teeth, since the winding wires and the stator core need to be handled separately and the winding wires are wound around the teeth with insulation paper held therebetween, the winding operation becomes complex, and the insulation paper is bitten into, whereby there are fears that an appropriate insulation performance cannot be ensured.

Then, in recent years, electric rotary machines have been proposed which employ segment coils as a different type of electric rotary machine stator. For example, in a stator for an electric rotary machine described in Patent Literature 1, a coil is made up of a plurality of slot coils that are inserted into slots and a plurality of connection coils that connect the slot coils on an axially outer side of an axial end face of the stator core, and an inner connection coil and an outer connection coil that are accommodated in different positions in an axial direction of an insulation plate are electrically joined together by a connection pin.

PRIOR ART LITERATURE

Patent Literature

Patent Literature 1: JP-B-5389109

SUMMARY OF THE INVENTION

Problem that the Invention is to Solve

However, in the stator for an electric rotary machine described in Patent Literature 1, since the configuration is adopted in which the insulation plate abuts against the circumference of the joining portion where the connection coils and the slot coils are connected together, in case heat is applied when the connection coils and the slot coils are joined together, there are fears that the insulation plate is damaged.

The invention provides a stator for an electric rotary machine that can suppress the generation of damage to an insulation plate by heat and which can suppress the reduction in insulation performance between connection coils in the insulation plate and a method for producing the stator.

Means for Solving the Problem

The invention provides the following Aspects.

Aspect 1 defines a stator (e.g., a stator 10 in embodiment) for an electric rotary machine including:

a stator core (e.g., a stator core 21 in embodiment), which has plural slots (e.g., slots 23 in embodiment); and a coil (e.g., a coil 50 in embodiment), which is attached to the stator core, wherein:

the coil has plural slot coils (e.g., slot coils 25 in embodiment) and plural connection coils (e.g., connection coils 40 in embodiment), each slot coil being inserted into the slot, each connection coil connecting the slot coils in a position lying further axially outwards than an axial end face (e.g., an end face 21a, 21b in embodiment) of the stator core, and the coil being constituted in such a way that the slot coil and the connection coil are joined at an abutment portion (e.g., an abutment plane P2, P3 in embodiment);

the connection coil is accommodated in an accommodating portion (e.g., an outer surface groove 37, an inner surface groove 38 in embodiment), which is provided in an insulation plate (e.g., base plates 31L, 31R in embodiment) that is made of an insulation material and that is disposed outwards of the axial end face of the stator core;

the connection coil is such that a connection coil main body (e.g., an outer connection coil main body 110, an inner connection coil main body 120 in embodiment) extends from one side to an other side in a circumferential direction;

the connection coil main body abuts against the insulation plate in such a state that the connection coil is accommodated in the accommodating portion; and in a hole portion (e.g., radially outer through holes 32, radially inner through holes 33 in embodiment), where the abutment portion is accommodated, of the insulation plate, the connection coil and the slot coil are spaced apart from the insulation plate in the circumferential direction to thereby form a first gap portion (a gap portion T2, T3).

Aspect 2 defines, based on Aspect 1, the stator for an electric rotary machine, wherein:

the connection coil is in abutment with the slot coil from the circumferential direction at the abutment portion; and the abutment portion is exposed from an axial end face (e.g., an outer surface 35 in embodiment) of the insulation plate as viewed from an axial direction.

Aspect 3 defines, based on Aspect 1 or Aspect 2, the stator for an electric rotary machine, wherein:

the connection coil includes an inner connection coil (e.g., an inner connection coil 42 in embodiment) and an outer connection coil (e.g., an outer connection coil 41 in embodiment) that are disposed in different axial positions;

the inner connection coil and the outer connection coil are joined individually to the slot coils at the abutment portions; and the inner connection coil and the outer connection coil are in abutment with the slot coils from a same direction in the circumferential direction at the abutment portions.

Aspect 4 defines, based on Aspect 3, the stator for an electric rotary machine, wherein:

the inner connection coil and the outer connection coil are joined to each other at an inner and outer connection coils abutment portion; and in an another hole portion (e.g., an outer circumferential hole 34 in embodiment) where the inner and outer connection coils abutment portion is accommodated, the inner connection coil and the outer connection coil are spaced apart from the insulation plate in the circumferential direction to thereby form a second gap portion (e.g., a gap portion T1 in embodiment).

Aspect 5 defines, based on Aspect 2 to Aspect 4, the stator for an electric rotary machine, wherein the connection coil and the slot coil are joined together in such a state that a surface contact pressure is generated between the connection coil and the slot coil at the abutment portion.

Aspect 6 defines, based on Aspect 1 to Aspect 5, the stator for an electric rotary machine, wherein:

the slot coil and the connection coil are each made up of a plate conductor; and the abutment portion is disposed so as to coincide with an imaginary line (e.g., an imaginary line Q in embodiment) that extends in a radial direction from an axis center (e.g., an axis center O in embodiment) of the stator.

Aspect 7 defines, based on Aspect 1 to Aspect 6, the stator for an electric rotary machine, wherein the slot coil and the connection coil are joined together in such a state that the insulation plate that accommodates therein the connection coil is pressed toward an axially inner side against the stator core into which the slot coils are inserted.

Aspect 8 defines, based on Aspect 7, the stator for an electric rotary machine, wherein:

the slot coil and the connection coil are joined together in such a state that the insulation plate that accommodates therein the connection coil, and the connection coil are pressed toward the axially inner side against the stator core into which the slot coils are inserted.

Aspect 9 defines, based on Aspect 7 or 8, the stator for an electric rotary machine, wherein:

the insulation plate includes a pair of insulation plates that are provided on both axially outer end faces of the stator core; and the slot coil and the connection coil are joined together in such a state that the pair of insulation plates are individually pressed toward axially inner sides with the stator core held therebetween.

Aspect 10 defines, based on Aspect 7 to Aspect 9, the stator for an electric rotary machine, wherein:

the stator includes an insulation sheet (e.g., an insulation sheet 65 in embodiment) between the stator core and the connection coil that is accommodated in the insulation plate; and the insulation plate is in abutment with the axial end face of the stator core on a part of a surface of the insulation plate that faces the stator core.

Aspect 11 defines, based on Aspect 7 to Aspect 10, the stator for an electric rotary machine, wherein the abutment portion is disposed on an inner circumferential side of the insulation plate.

Aspect 12 defines a method for producing a stator (e.g., a stator 10 in embodiment) for an electric rotary machine, the stator including:

a stator core (e.g., a stator core 21 in embodiment), which has plural slots (e.g., slots 23 in embodiment); and a coil (e.g., a coil 50 in embodiment), which is attached to the stator core, wherein:

the coil has plural slot coils (e.g., slot coils 25 in embodiment) and plural connection coils (e.g., connection coils 40 in embodiment), each slot coil being inserted into the slot, each connection coil connecting the slot coils in a position lying further axially outwards than an axial end face (e.g., an end face 21a, 21b in embodiment) of the stator core, and the coil being constituted in such a way that the slot coil and the connection coil are joined at an abutment portion (e.g., an abutment plane P2, P3 in embodiment);

the connection coil is accommodated in an accommodating portion (e.g., an outer surface groove 37, an inner surface groove 38 in embodiment), which is provided in an insulation plate (e.g., base plates 31L, 31R in embodiment) that is made of an insulation material and that is disposed outwards of the axial end face of the stator core;

the connection coil is such that a connection coil main body (e.g., an outer connection coil main body 110, an inner connection coil main body 120 in embodiment) extends from one side to an other side in a circumferential direction;

the connection coil main body abuts against the insulation plate in such a state that the connection coil is accommodated in the accommodating portion; and in a hole portion (e.g., radially outer through holes 32, radially inner through holes 33 in embodiment), where the abutment portion is accommodated, of the insulation plate, the connection coil and the slot coil are spaced apart from the insulation plate in the circumferential direction to thereby form a gap portion (a gap portion T2, T3), the method including:

an abutment step of bringing the connection coil and the slot coil into abutment with each other from the circumferential direction at the abutment portion; and a joining step of joining the abutment portion that is exposed from an axial end face of the insulation plate from an axially outer side of the hole portion.

Aspect 13 defines, based on Aspect 12, the method, wherein in the joining step, the abutment portion is joined in such a state that a surface contact pressure is applied to the connection coil and the slot coil.

Aspect 14 defines, based on Aspect 12 or Aspect 13, the method, wherein:

the connection coil each includes an inner connection coil (e.g., an inner connection coil 42 in embodiment) and an outer connection coil (e.g., an outer connection coil 41 in embodiment) that are disposed in different axial positions;

the inner connection coil and the outer connection coil are individually brought into abutment with the slot coils from a same direction in the circumferential direction at the abutment portions by rotating the insulation plate and the stator core relatively; and in the joining step, the abutment portions are joined in such a state that a surface contact pressure is applied to the inner connection coil and the outer connection coil, and the slot coils.

Aspect 15 defines, based on Aspect 12 to Aspect 14, the method, wherein the method further includes a pressing step of pressing the insulation plate that accommodates therein the connection coil toward an axially inner side against the stator core into which the slot coils are inserted; and in the joining step, the abutment portion is joined in such a state that the insulation plate is pressed against the stator core.

Aspect 16 defines, based on Aspect 15, the method, wherein in the pressing step, the insulation plate that accommodates therein the connection coil, and the connection coil are pressed toward the axially inner side against the stator core into which the slot coils are inserted.

Aspect 17 defines, based on Aspect 15 or Aspect 16, the method, wherein:

the insulation plate includes a pair of insulation plates that are provided on both axially outer end faces of the stator core; and in the pressing step, the pair of insulation plates individually press toward axially inner sides with the stator core held therebetween.

Advantage of the Invention

According to Aspect 1, the connection coil main body of the connection coil is brought into abutment with the insulation plate in such a state that the connection coil is accommodated in the accommodating portion of the insulation plate, whereby the connection coil is fixed, and in the hole portion where the abutment portion is accommodated, the first gap portion is formed between the connection coil and the slot coil, and the insulation plate. Thus, even in the event that the coil is joined to each other at the abutment portion by applying heat thereto through, for example, laser welding, it is possible to suppress the occurrence of damage to the peripheral insulation plate by heat, thereby making it possible to suppress the reduction in insulation performance between the connection coils in the insulation plate.

According to Aspect 2, the connection coil is in abutment with the slot coil from the circumferential direction at the abutment portion, and the abutment portion is exposed from the axial end face of the insulation plate as viewed from the axial direction. Thus, the connection coil that is accommodated in the accommodating portion in the insulation plate can easily be joined from the axially outer side of the hole portion in the insulation plate.

According to Aspect 3, both the inner connection coil and the outer connection coil can be brought into abutment with the slot coils by rotating the insulation plate from one circumferential direction to the other circumferential direction, and therefore, both the inner connection coil and the outer connection coil can easily be brought into abutment with the slot coils, whereby the abutment state can be realized which can easily obtain good joining.

According to Aspect 4, in the hole portion where the inner and outer connection coils abutment portion is accommodated, the second gap portion is formed between the inner connection coil and outer connection coil, and the insulation plate. Thus, even in the event that the inner connection coil and outer connection coil are joined to each other at the abutment portion by applying heat thereto through, for example, laser welding, it is possible to suppress the occurrence of damage to the peripheral insulation plate by heat, thereby making it possible to suppress the reduction in insulation performance between the connection coils in the insulation plate.

According to Aspect 5, the connection coil and the slot coil can be joined together in such a state that the connection coil and the slot coil are brought into abutment with each other in an ensured fashion, and therefore, even in the event that a predetermined tolerance exists in the positions of the plural slot coils or the plural connection coils, it is possible to suppress the occurrence of contact failure due to the tolerance in positions of the connection coils and the slot coils.

According to Aspect 6, when the insulation plate is rotated from the one direction to the other direction in the circumferential direction, the plate conductors can be brought into abutment with each other over a wide area, and therefore, not only can the joining strength be improved but also it is possible to suppress an increase in contact resistance.

According to Aspect 7, in the production process of the stator, the connection coil that is accommodated in the insulation plate is joined to the slot coil that is inserted into the stator core in such a state that the insulation plate is pressed toward an axially inner side against the stator core. Owing to this, even in the event that the pressing force on the insulation plate in the stator production process to press it against the stator core is lost, the load from the insulation plate to the stator core still remains. This residual load can realize the stator that can suppress the occurrence of a deviation from the proper relative position among the coil, the stator core, and the insulation plate. In addition, no thermosetting resin such as varnish is used in producing the stator, and therefore, it is possible to produce the stator with good efficiency. In this way, it is possible to produce the stator in which the deviation from the relative position among the parts involved is suppressed with good efficiently.

According to Aspect 9, in the production process of the stator, the slot coils and the connection coils are joined together in such a state that the pair of insulation plates are pressed towards axially inner sides with the stator held therebetween. Compared with a case where insulation plates are pressed against one side of the stator core at a time, the stator core can be produced efficiently.

According to Aspect 10, the insulation plate is brought into abutment with the stator core on a part of the surface of the insulation plate that faces the stator core without involving the insulation sheet therebetween. Consequently, the load can be applied directly to the stator core from the insulation plate while realizing insulation between the stator core and the connection coils with the insulation sheet. In addition, no load is applied to the insulation sheet, and therefore, an insulation sheet having a relatively low strength against the load, for example an insulation paper, can be used as the insulation sheet.

According to Aspect 11, the abutment portion between the slot coil and the connection coil are disposed on the inner circumferential side of the insulation plate, and therefore, even in a state in which the insulation plate is pressed axially inwards against the stator core from a radially outer side of the electric rotary machine by a jig, a nozzle of a welding machine can easily access the abutment portion. This enables the slot coil and the connection coil to be joined together easily.

According to Aspect 12, the connection coil main body of the connection coil is brought into abutment with the insulation plate in such a state that the connection coil is accommodated in the accommodating portion of the insulation plate, whereby the connection coil is fixed, and in the hole portion where the abutment portion is accommodated, the gap portion is formed between the connection coil and the slot coil, and the insulation plate. Thus, even in the event that the coil is joined to each other at the abutment portion by applying heat thereto through, for example, laser welding, it is possible to suppress the occurrence of damage to the peripheral insulation plate by heat, thereby making it possible to suppress the reduction in insulation performance between the connection coils in the insulation plate. In addition, the abutment portion is exposed from the axial end face of the insulation plate, and therefore, the connection coil that is accommodated in the accommodating portion of the insulation plate can be joined easily from the axially outer side of the insulation plate.

According to Aspect 13, the connection coil and the slot coil can be joined together in such a state that the connection coil and the slot coil are brought into abutment with each other in an ensured fashion by joining them with a surface contact pressure applied in the circumferential direction, and therefore, even in the event that a predetermined tolerance exists in the positions of the plurality of slot coils or the plurality of connection coils, it is possible to suppress the occurrence of contact failure due to the tolerance in positions of the connection coils and the slot coils.

According to Aspect 14, both the inner connection coil and the outer connection coil can easily be brought into abutment with the slot coils by rotating the insulation plate from the one direction to the other direction in the circumferential direction.

According to Aspect 15 and Aspect 16, in the production process of the stator, the connection coil that is accommodated in the insulation plate is joined to the slot coil that is inserted into the stator core in such a state that the insulation plate is pressed toward the axial inner side against the stator core. Owing to this, even in the event that the pressing force on the insulation plate in the stator production process to press it against the stator core is lost, the load from the insulation plate to the stator core still remains. This residual load can realize the stator that can suppress the occurrence of a deviation from the proper relative position among the coil, the stator core, and the insulation plate. In addition, no thermosetting resin such as varnish is used in producing the stator, and therefore, it is possible to produce the stator with good efficiency. In this way, it is possible to produce the stator in which the deviation from the relative position among the parts involved is suppressed with good efficiency.

According to Aspect 17, in the production process of the stator, the slot coil and the connection coil are joined together in such a state that the pair of insulation plates are pressed toward axial inner sides with the stator held therebetween. Compared with a case where insulation plates are pressed against one side of the stator core at a time, the stator core can be produced efficiently.

BRIEF DESCRIPTION OF DRAWINGS

FIG. 23 shows front views showing part of the base plate assembly corresponding to steps shown in FIG. 22.

MODE FOR CARRYING OUT THE INVENTION

Figure 1:
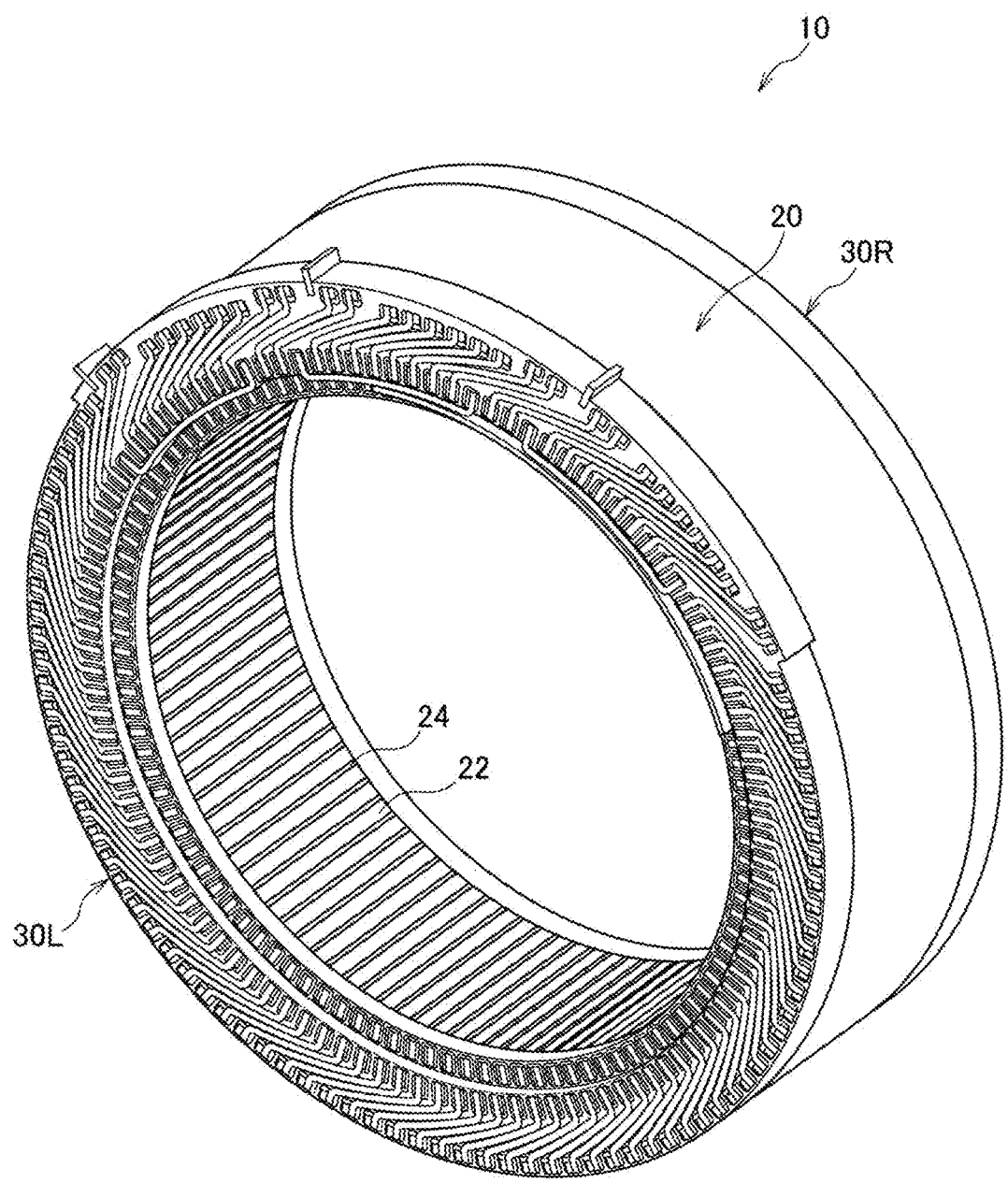
FIG. 1 is a perspective view of a stator for an electric rotary machine according to the invention.

Hereinafter, embodiments of a stator for an electric rotary machine of the invention will be described based on the accompanying drawings. The drawings should be seen in a direction in which reference numerals given therein look proper.

First Embodiment

[Stator]

Figure 2:
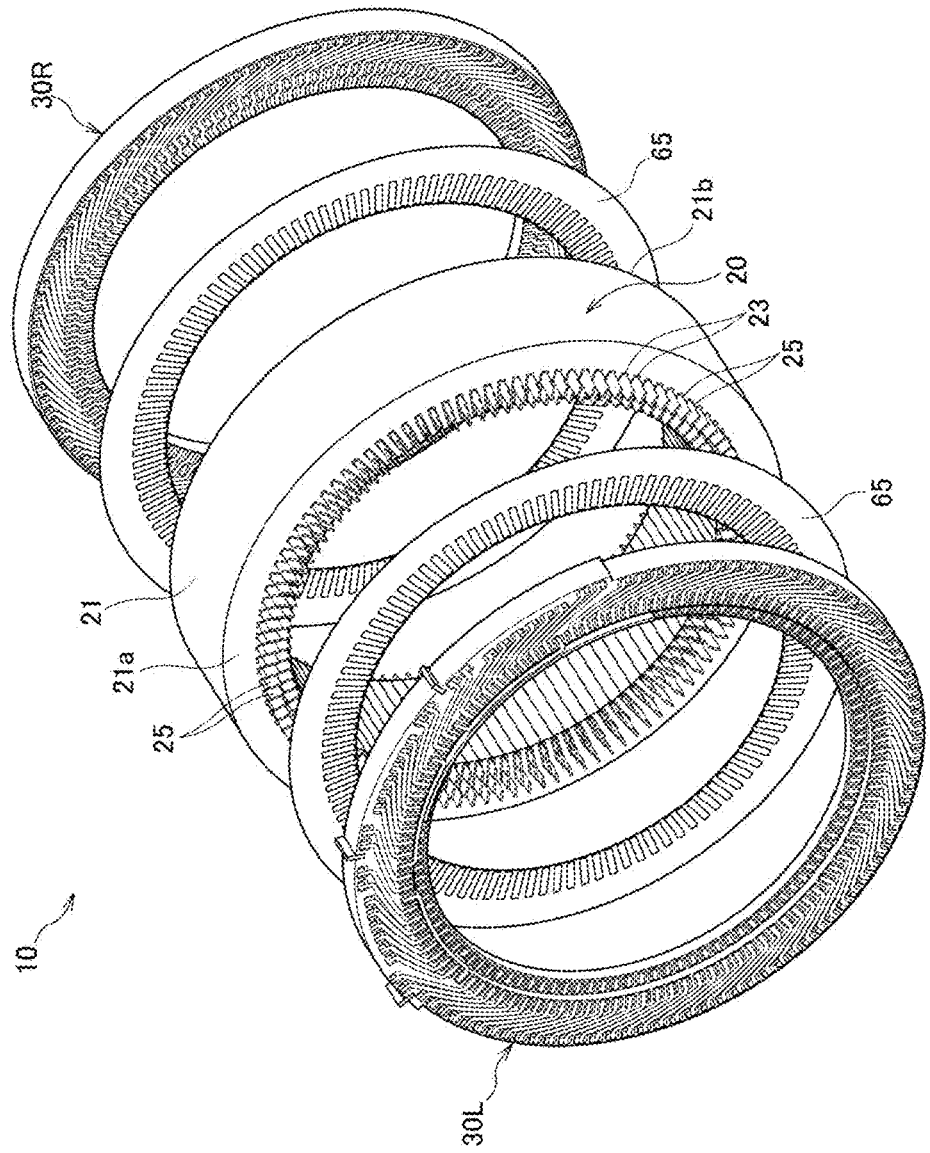
FIG. 2 is an exploded perspective view of the stator shown in FIG. 1.

As shown in FIGS. 1 and 2, a stator 10 for an electric rotary machine of this embodiment includes a stator core assembly 20 and a pair of base plate assemblies 30L, 30R, and the base plate assemblies 30L, 30R are disposed at both ends of the stator core assembly 20. An insulation sheet 65 of, for example, a silicone sheet is disposed between the stator core assembly 20 and each of the base plate assemblies 30L, 30R to insulate the stator core assembly 20 from the base plate assemblies 30L, 30R.

[1 Stator Core Assembly]

The stator core assembly 20 includes a stator core 21 and plural (108 in the illustrated embodiment) slot coils 25.

[1-1 Stator Core]

The stator core 21 is made up, for example, of plural pressed and punched sheets of silicon steel that are laminated together and includes plural (108 in the illustrated embodiment) teeth 22 and plural (108 in the illustrated embodiment) slots 23 that are defined between the adjacent teeth 22 on a radially inner side thereof. The slots 23 are formed so as to penetrate the stator core 21 in an axial direction thereof, are each formed into a substantially elliptic shape that is long in a radial direction of the stator core 21 as seen in the axial direction and each has an opening portion 24 that opens to an inner circumferential surface of the stator core 21.

[1-2 Slot Coil]

Figure 5A:
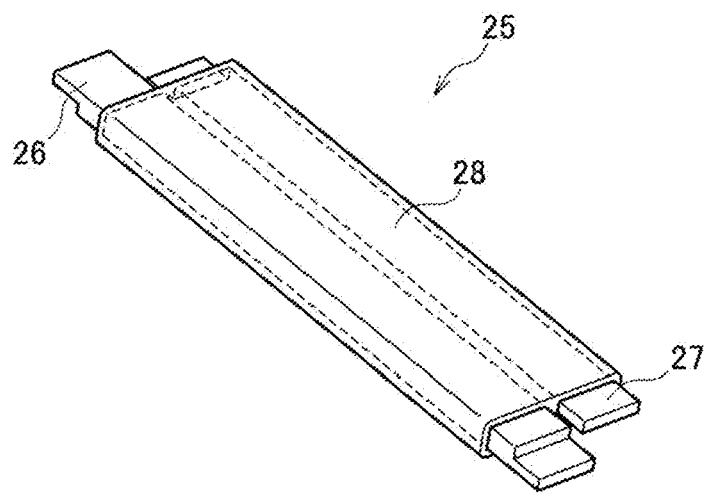
FIG. 5A is a perspective view of a slot coil.
Figure 5B:
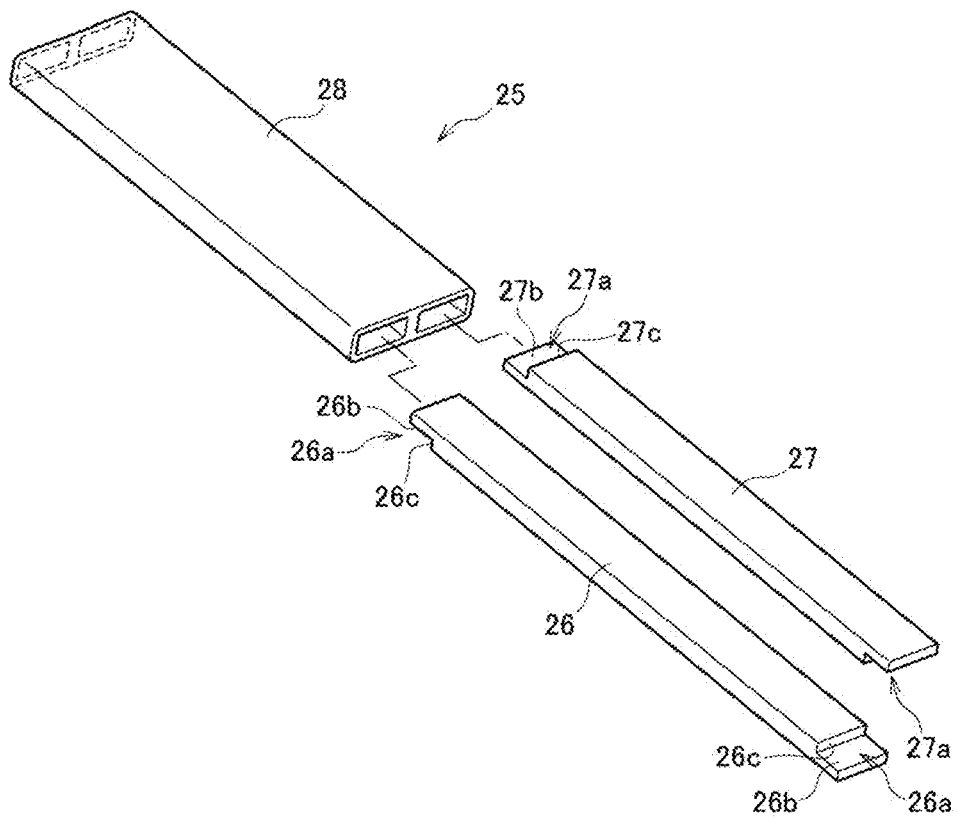
FIG. 5B is an exploded perspective view of the slot coil.
Figure 6:
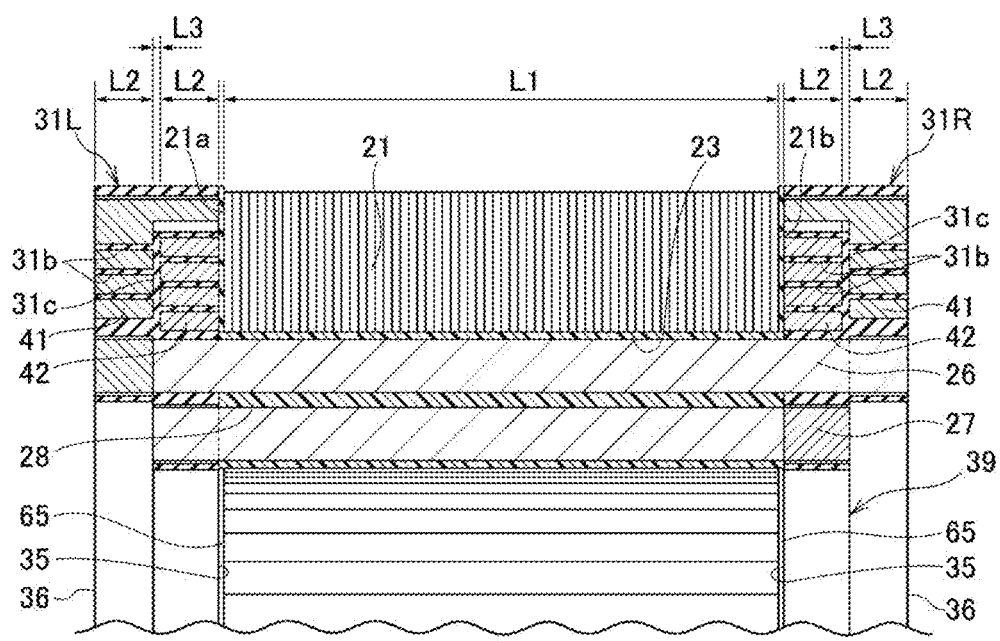
FIG. 6 is a vertical sectional view showing part of the stator shown in FIG. 1.

Referring also to FIGS. 5A, 5B and 6, the slot coil 25 inserted into each slot 23 has a radially outer slot coil 26 and a radially inner slot coil 27 which are both a plate conductor having a rectangular section, and the radially outer slot coil 26 and the radially inner slot coil 27 are surrounded therearound excluding axial end portions thereof by an insulation material 28 having a rectangular section which is an injection molded resin, whereby the radially outer slot coil 26 and the radially inner slot coil 27 are formed into an integral unit. Specifically speaking, the radially outer slot coil 26 is set at a length (L1+4×L2) that is substantially equal to a sum of an axial width L1 of the stator core 21 and a total axial width (4×L2) of four connection coils 40, which will be described later, and axial end portions are exposed individually from the insulation material 28 by a length (2×L2) substantially equaling a total axial width of two connection coils 40. Further, at one axial end portion of the radially outer slot coil 26, a surface oriented in one circumferential direction is cut out by a length (L2) equaling the axial width of one connection coil 40 in a step-like fashion so as to reduce a thickness of the one axial end portion, whereby a step portion 26a is formed on the one axial end portion, while at the other axial end portion of the radially outer slot coil 26, a surface oriented in the other circumferential direction is cut out by the length (L2) equaling the axial width of one connection coil 40 in a step-like fashion so as to reduce a thickness of the other axial end portion, whereby a step portion 26a is formed on the other axial end portion.

The radially inner slot coil 27 is set at a length (L1+2×L2) that is substantially equal to a sum of the axial width (L1) of the stator core 21 and a total axial width (2×L2) of two connection coils 40, which will be described later, and axial end portions are exposed individually from the insulation material 28 by the length (L2) substantially equaling an axial width of one connection coil 40. Further, at one axial end portion of the radially inner slot coil 27, a surface oriented in the other circumferential direction is cut out by a length (L2) equaling the axial width of one connection coil 40 in a step-like fashion so as to reduce a thickness of the one axial end portion, whereby a step portion 27a is formed on the one axial end portion, while at the other axial end portion of the radially inner slot coil 27, a surface oriented in the one circumferential direction is cut out by the length (L2) equaling the axial width of one connection coil 40 in a step-like fashion so as to reduce a thickness of the other axial end portion, whereby a step portion 27a is formed on the other axial end portion.

In other words, in the slot coil 25, the radially outer slot coil 26 is exposed from the insulation material 28 at the axial ends thereof by the length (2×L2) substantially equaling the total axial width of two connection coils 40, and the radially inner slot coil 27 is exposed from the insulation material 28 at the axial ends thereof by the length (L2) equaling the axial width of one connection coil 40. The step portions 26a, 27a are formed at the distal end portions of the radially outer slot coil 26 and the radially inner slot coil 27 by the length (L2) equaling the axial width of one connection coil 40 so as to be oriented in the opposite circumferential directions. In addition, the step portions 26a of the radially outer slot coil 26 and the step portions 27a of the radially inner slot coil 27 are formed so as to be oriented in the opposite circumferential directions at the one axial end portion and the other axial end portion.

The plural (108 in the illustrated embodiment) slot coils 25 each made up of the radially outer slot coil 26 and the radially inner slot coil 27 are disposed along the radial directions of the stator core 21 so that the radially outer slot coils 26 are situated on a radially outer side and the radially inner slot coils 27 are situated on a radially inner side. The slot coils 25 are inserted individually into the plural slots 23 formed in the stator core 21 and are aligned in the circumferential direction of the stator core 21, thereby making up the stator core assembly 20.

The radially outer slot coil 26 is inserted into the slot 23 so that the distal end portions project individually from both end faces 21a, 21b of the stator core 21 by the distance (2×L2) that is substantially equal to the total axial width of substantially two connection coils 40, and the radially inner slot coil 27 is inserted into the slot 23 so that the distal end portions project individually from both the end faces 21a, 21b of the stator core 21 by the length (L2) that is equal to the axial width of substantially one connection coil 40.

The insulation material 28 that covers the radially outer slot coil 26 and the radially inner slot coil 27 is interposed between both the slot coils 26, 27 and the slot 23 in the stator core 21 so as to ensure the insulation between the radially outer and inner slot coils 26, 27 and the stator core 21.

The insulation material 28 that covers the radially outer slot coil 26 and the radially inner slot coil 27 has substantially the same shape as that of the slot 23 but is slightly greater than the slot 23, and the insulation material 28 can easily be fixed into the slot 23 through press fitting. Since the radially outer slot coil 26 and the radially inner slot coil 27 are thicker than the conventional coils that are made up of the winding wires wound around the teeth, the space factor of the slot 23 is advantageously improved.

[2 Base Plate Assembly]

Figure 3:
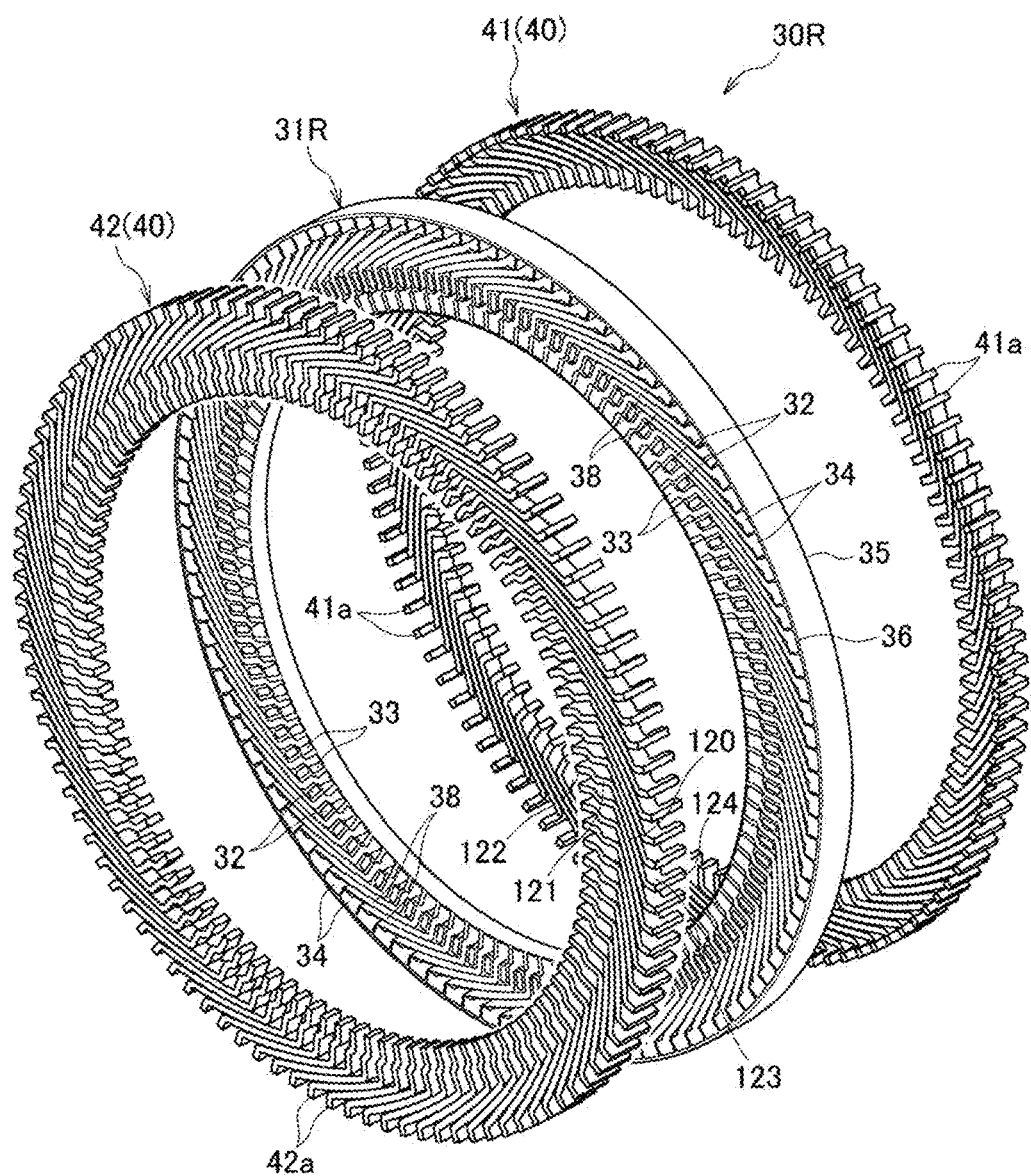
FIG. 3 is an exploded perspective view of one of base plate assemblies shown in FIG. 2.
Figure 4:
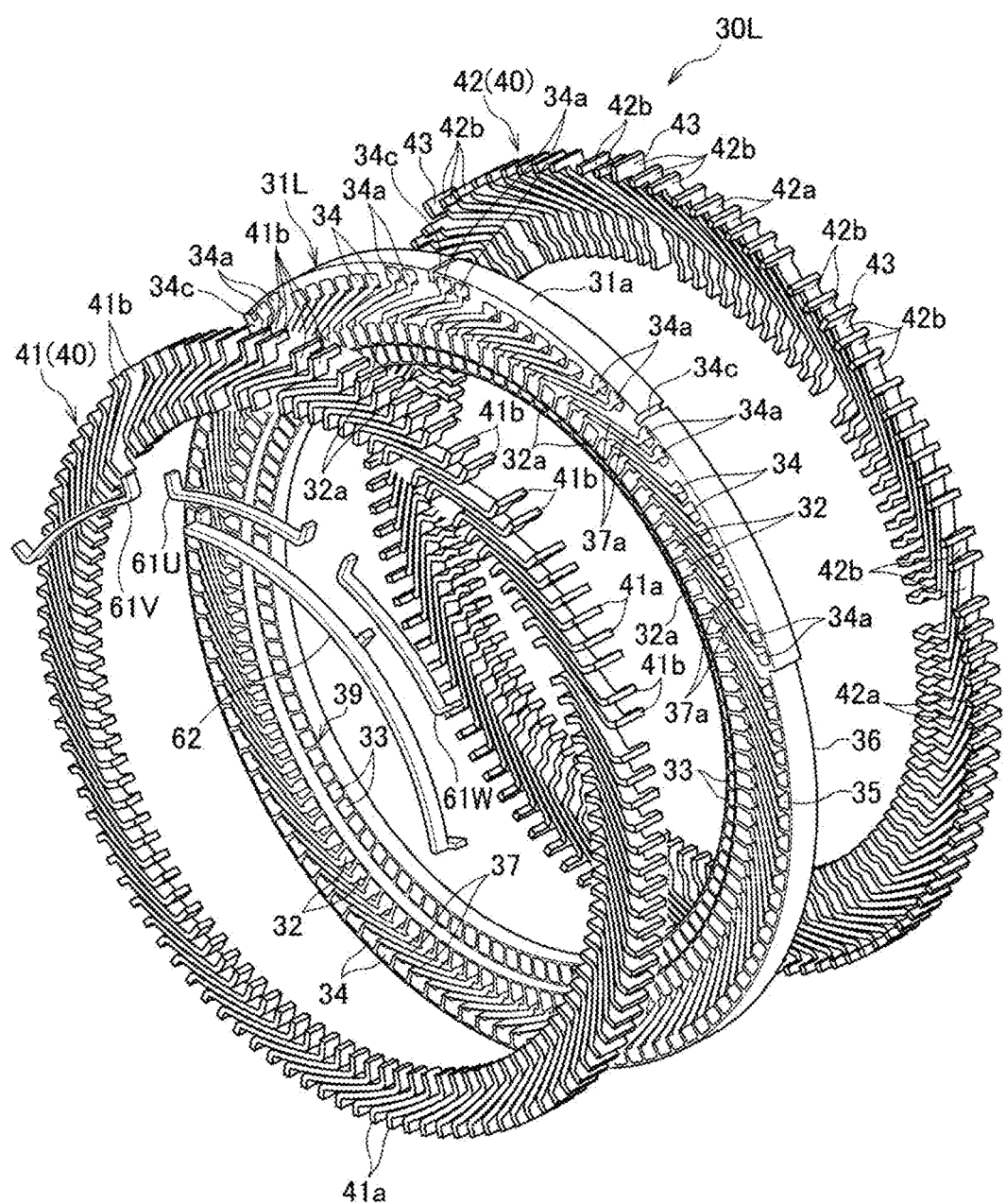
FIG. 4 is an exploded perspective view of the other of the base plate assemblies shown in FIG. 2.

The base plate assemblies 30L, 30R that are disposed individually at the ends of the stator core assembly 20 include base plates 31L, 31R and plural connection coils 40, as shown in FIGS. 3 and 4.

[2-1 Base Plates]

The base plates 31L, 31R are substantially annular members that are formed from a resin having insulation properties (a non-magnetic material) and which have a bore diameter and an outside diameter that are substantially the same as those of the stator core 21.

As shown in FIG. 3, a plurality (108 in the illustrated embodiment) of radially outer through holes 32 and a plurality (108 in the illustrated embodiment) of radially inner through holes 33 are formed at equal intervals in a radially inner side of the base plate 31R so as to correspond to the radially outer slot coils 26 and the radially inner slot coils 27, respectively, of the slot coils 25 that are inserted into the slots 23 in the stator core 21. The radially outer through holes 32 and the radially inner through holes 33 penetrate the base plate 31R to establish a communication between an outer surface 35 and an inner surface 36 of the base plate 31R. By assembling the base plate assembly 30R to the stator core assembly 20, the distal end portions of the radially outer slot coils 26 that are inserted into the slots 23 in the stator core 21 and which project from the end faces 21b of the stator core 21 are disposed in the radially outer through holes 32 of the base plate 31R and the distal end portions of the radially inner slot coils 27 that are inserted into the slots 23 in the stator core 21 and which project from the end faces 21b of the stator core 21 are disposed in the radially inner through holes 33 of the base plate 31R. In the radially outer through holes 32, opening portions that open to the inner surface 36 are smaller than opening portions that open to the outer surface 35, and are caused to penetrate the base plate 31R at only portions where the distal end portions of the radially outer slot coils 26 pass through.

Figure 7A:
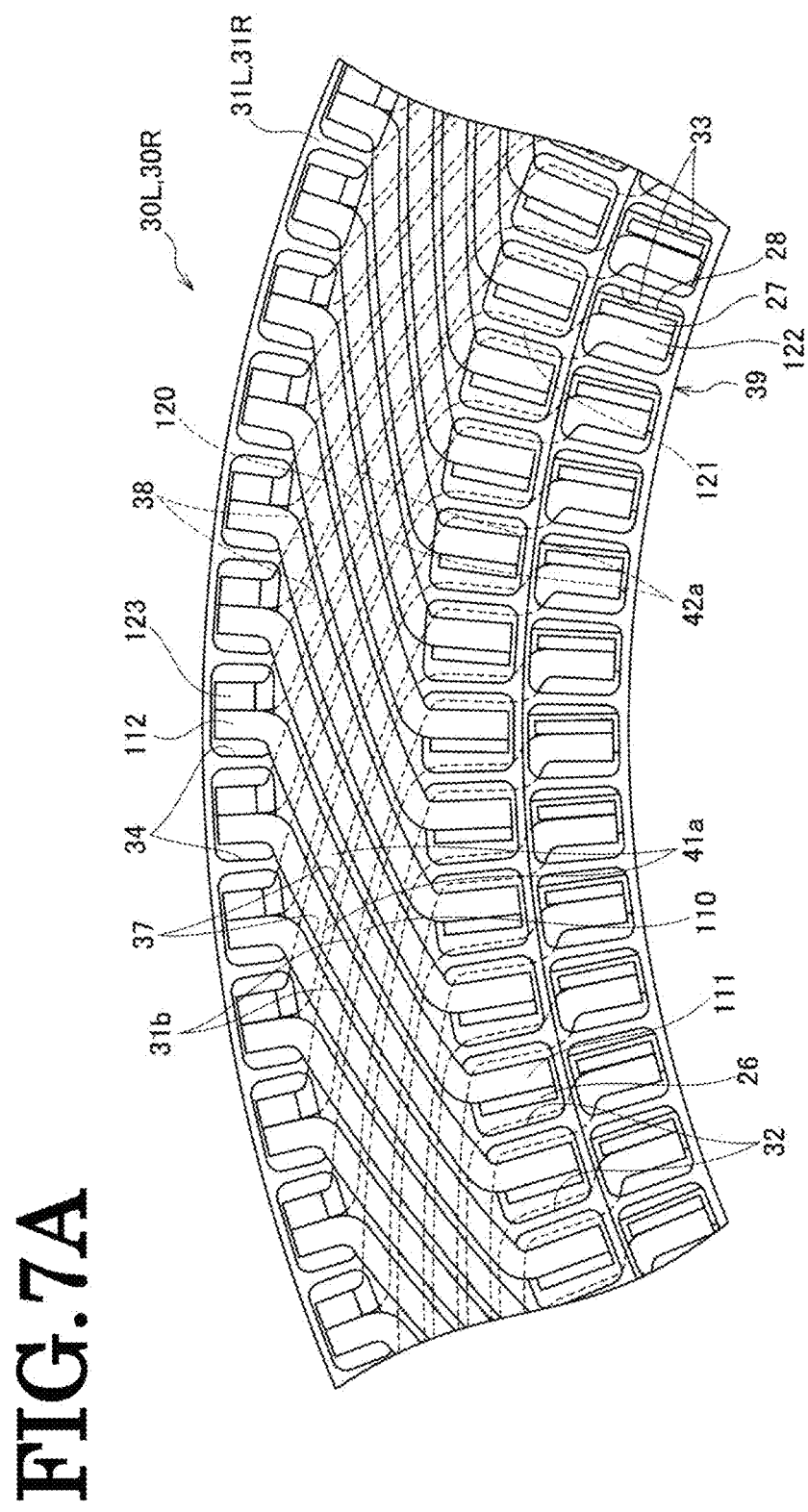
FIG. 7A is a front view showing part of the base plate assemblies shown in FIGS. 3 and 4.

Further, plural (108 in this illustrated embodiment) outer circumferential holes are formed at equal intervals in a radially outer side of the base plate 31R so as to penetrate the base plate 31R, whereby a communication is established between the outer surface 35 and the inner surface 36. As shown in FIG. 7A, plural (108 in this illustrated embodiment) outer surface grooves 37 and plural (108 in this illustrated embodiment) inner surface grooves 38 are formed on the outer surface 35 and the inner surface 36 of the base plate 31R, respectively, so as to extend in circumferential directions along involute curves in such a way as to lie close to one another. The outer surface grooves 37 and the inner surface grooves 38 have a substantially U-shaped cross section and open to the outer surface 35 and the inner surface 36, respectively.

The base plate 31L basically has a similar construction to that of the base plate 31R. A plurality (108 in the illustrated embodiment) of radially outer through holes 32 and a plurality (108 in the illustrated embodiment) of radially inner through holes 33 are also formed at equal intervals in a radially inner side of the base plate 31L so as to correspond to the radially outer slot coils 26 and the radially inner slot coils 27, respectively, of the slot coils 25 that are inserted into the slots 23 in the stator core 21. The radially outer through holes 32 and the radially inner through holes 33 penetrate the base plate 31L so as to establish a communication between the outer surface 35 and the inner surface 36 of the base plate 31R.

On the other hand, a deployed portion 31a that extends into a fan shape is provided on a radially outer side of an upper portion in the figure on a radially outer side of the base plate 31L, and plural outer circumferential holes 34 are formed at equal intervals in other portions than the deployed portion 31a so as to penetrate the base plate 31L to thereby establish a communication between the outer surface 35 and the inner surface 36. In the deployed portion 31a, two sets of two outer circumferential holes 34a, each having an opening area that is slightly greater than that of the other outer circumferential holes 34, are formed for each of U, V and W phases in such a way as to hold six outer circumferential holes 34 therebetween, and input terminal notched portions 34c are formed at equal intervals one for each phase. Input terminal portions 43 of three inner connection coils 42b with which the input terminal portions 43 are formed integrally are disposed individually in the input terminal notched portions 34c. The inner connection coils 42b will be described later.

On a radially inner side of the deployed portion 31a of the base plate 31L, a set of two radially outer through holes 32a, each having a busbar notched portion (not shown) formed on an inner circumferential side thereof, are formed for each phase in such a way as to hold eight radially outer through holes 32 therebetween. Further, radially inner through hole 33a having a middle point busbar notched portion (not shown) formed on an inner circumferential side thereof are formed for each phase in such a way as to hold eleven radially inner through holes 33 therebetween. Busbar connecting portions of busbars 61U, 61V, 61W that connect coils of the same phase together are disposed in the busbar notched portions, and middle point busbar connecting portions of middle point busbars 62 that connect coils of U, V, W phases together are disposed in the middle point busbar notched portions.

Radially outer end portions 112 of outer connection coils 41 and radially outer end portions 123 of inner connection coils 42, which will be described later, are disposed in the outer circumferential holes 34, 34a of the base plates 31L, 31R. The radially outer through holes 32, 32a, the radially inner through holes 33, 33a and the outer circumferential holes 34, 34a exhibit a rectangular shape as seen from the axial direction and have a space greater than the coil member that is disposed in an interior thereof.

In addition, a plurality (102 in the outer surface 35 in this illustrated embodiment) of outer surface grooves 37 and a plurality (102 in the inner surface 36 in this illustrated embodiment) of inner surface grooves 38 are formed also on the outer surface 35 and the inner surface 36 of the base plate 31L, respectively, so as to extend in circumferential directions along involute curves in such a way as to lie close to one another. The outer surface grooves 37 and the inner surface grooves 38 have a substantially U-shaped cross section and open to the outer surface 35 and the inner surface 36, respectively. In the deployed portion 31a of the base plate 31L, a total of twelve, four for each phase, outer surface grooves 37a that are formed slightly longer than the other outer surface grooves 37 are formed on the outer surface 35, and a total of fifteen, five for each phase, inner surface grooves 38a that are formed slightly longer than the other inner surface grooves 38 are formed on the inner surface 36. The number of outer surface grooves 37, 37a is smaller by six, two for each phase, than the number of outer surface grooves 37 that are formed on the base plate 31R, and the number of inner surface grooves 38, 38a is smaller by three, one for each phase, than the number of inner surface grooves 38 that are formed on the base plate 31R. Instead, the coils of the same phases are connected together by the busbars 61U, 61V, 61W and the coils of different phases are connected together by the middle point busbars 62. In these base plates 31L, 31R, as shown in FIG. 6, the outer surface grooves 37, 37a that lie adjacent to one another and the inner surface grooves 38, 38a that lie adjacent to one another are isolated by walls 31b that rise from the base plate 31L, and the outer surface grooves 37, 37a and the inner surface grooves 38, 38a that face each other in the axial direction are isolated by partition walls 31c, whereby the individual grooves are electrically insulated from one another.

In the base plates 31L, 31R, a radially innermost portion 39 where the radially inner through holes 33 are formed is set at a length (L2) that is equal to an axial width of one connection coil 40, and the other area than the radially innermost portion 39 where the radially outer through holes 32 and the outer circumferential holes 34 are formed is set at an axial width (2×L2+L3) that is substantially equal to a sum of a total axial width (2×L2) of two connection coils 40 and a thickness (L3) of the partition wall 31c.

Figure 7B:
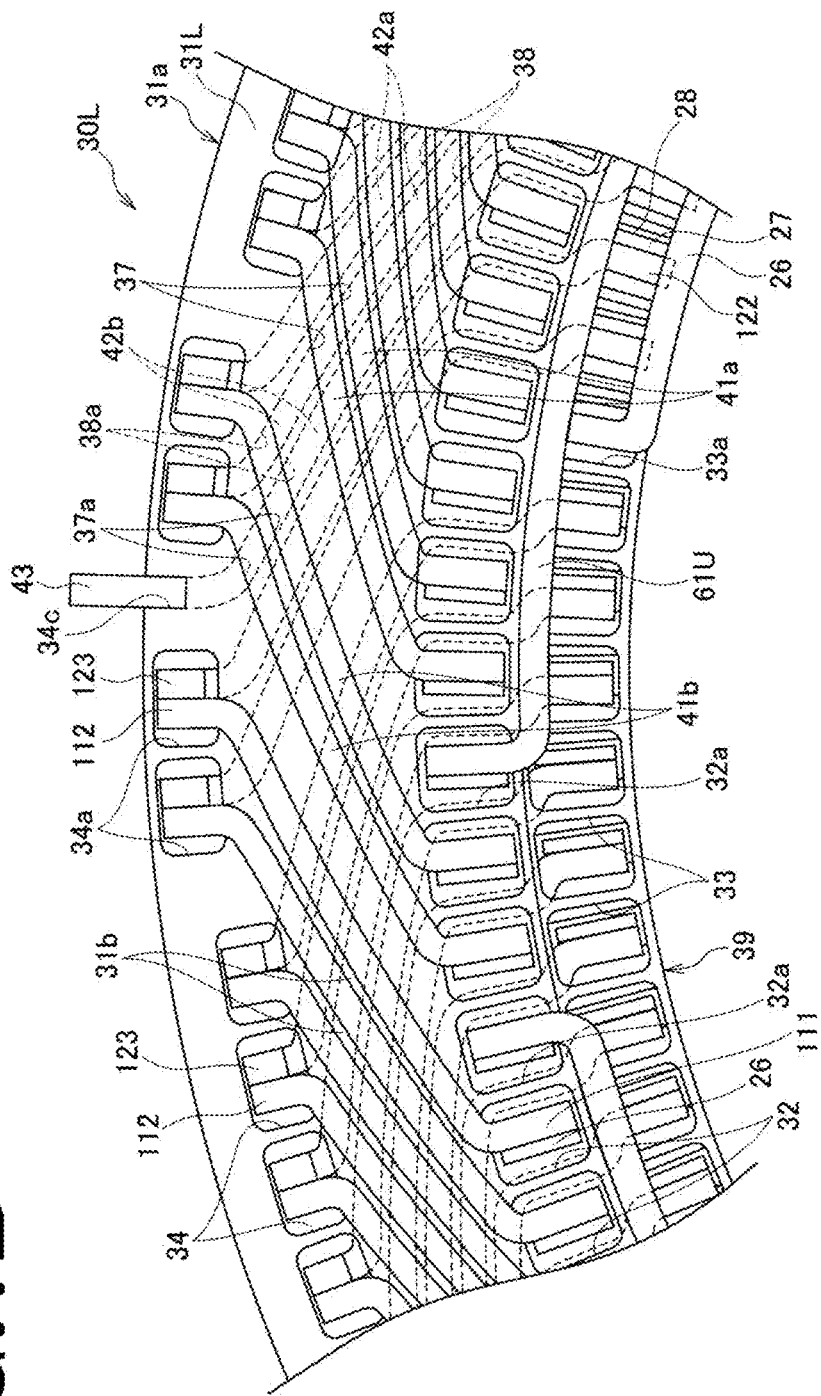
FIG. 7B is a front view showing part of the base plate assembly shown in FIG. 4.

In the base plate assemblies 30L, 30R, as shown in FIG. 7A, each of the outer surface grooves 37 of the base plates 31L, 31R is formed to be curved along the involute curve so as to connect the outer circumferential hole 34 and the radially outer through hole 32 that is spaced a predetermined angle in a counterclockwise direction from the outer circumferential hole 34, when seen from the front. As shown in FIG. 7B, however, in the plural outer surface grooves 37 on the base plate 31L, each of the twelve outer surface grooves 37a that extends towards the deployed portion 31a is formed to be curved along the involute curve so as to connect the outer circumferential hole 34a and the radially outer through hole 32 that is spaced an angle that is slightly greater than the predetermined angle in the counterclockwise direction from the outer circumferential hole 34a. FIGS. 7A, 7B show a state in which the outer connection coils 41 and the inner connection coils 42 described later are accommodated in the outer surface grooves 37 and the inner surface grooves 38, respectively.

Each of the inner surface grooves 38 of the base plates 31L, 31R is formed to be curved while avoiding the radially outer through hole 32 so as to connect the outer circumferential hole 34 and the radially inner through hole 33 that are spaced a predetermined angle in the counterclockwise direction (in a clockwise direction as seen from the side shown in FIG. 7A) from the outer circumferential hole 34, when seen from the front. As shown in FIG. 7B, however, in the plural inner surface grooves 38 on the base plate 31L, each of the twelve inner surface grooves 38a that extends towards the deployed portion 31a of the base plate 31L is formed to be curved along the involute curve so as to connect the outer circumferential hole 34a and the radially inner through hole 33 that is spaced an angle that is slightly greater than the predetermined angle in the counterclockwise direction from the outer circumferential hole 34a. The remaining three inner surface grooves 38a in the fifteen inner surface grooves 38a communicate with the input terminal notched portions 34c.

Namely, as shown in FIGS. 7A and 7B, the radially outer through holes 32 and the radially inner through holes 33 are connected via the outer circumferential holes 34 to which the outer surface grooves 37 and the inner surface grooves 38 continue commonly or the outer circumferential holes 34a to which the outer surface grooves 37a and the inner surface grooves 38a continue commonly.

[2-2 Connection Coils]

The connection coils 40 are formed of a conductive material such as copper into a plate shape and include the outer connection coils 41 (41a, 41b) that are inserted individually into the outer surface grooves 37, 37a and the inner connection coils 42 (42a, 42b) that are inserted individually into the inner surface grooves 38. When referred to herein, the outer connection coils 41 mean the connection coils 40 that come to lie on an axially outer side of the stator 10 and the inner connection coils 42 mean the connection coils 40 that come to lie on an axially inner side of the stator core 10 when the stator core assembly 20 and the base plate assemblies 30L, 30R are assembled together.

Figure 13A:
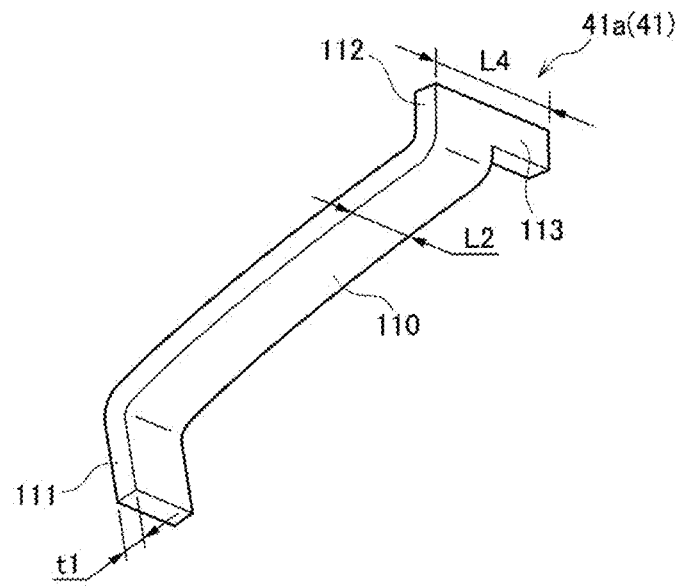
FIG. 13A is a perspective view of an outer connection coil.

As shown in FIG. 13A, the outer connection coil 41a is a plate conductor having a uniform thickness and a rectangular cross section. A radially inner end portion 111 is bent radially from an outer connection coil main body 110 that is formed so as to extend along an involute curve having the same shape as that of the outer surface groove 37, and a radially outer end portion 112 is also bent radially from the outer connection coil main body 110. An outer connection coil extending portion 113 is formed at the radially outer end portion 112 of the outer connection coil 41a so as to extend axially inwards. Axial widths (L2) of the outer connection coil main body 110 and the radially inner end portion 111 are equal to a depth of the outer surface groove 37, and an axial width (L4) of the outer connection coil extending portion 113 is set at an axial width (2×L2+L3) that is equal to a sum of the depths of the outer surface groove 37 and the inner surface groove 38 and a thickness (L3) of the partition wall 31c. In addition, the twelve outer connection coils 41b have the same construction as that of the outer connection coil 41a except that an outer connection coil main body 110 is formed so as to be curved into the same shape as that of the outer surface groove 37a.

Figure 13B:
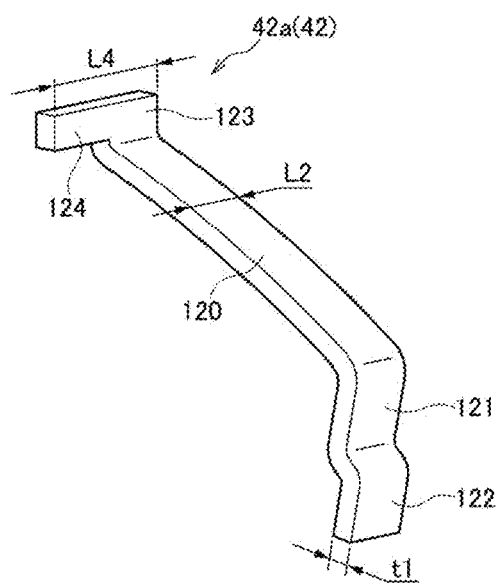
FIG. 13B is a perspective view of an inner connection coil.

As shown in FIG. 13B, the inner connection coil 42a is a plate conductor having a uniform thickness and a rectangular cross section. A radially inner end portion 122 is bent radially from an inner connection coil main body 120 that is formed so as to extend along an involute curve having the same shape as that of the inner surface groove 38 by way of a bypass portion 121 that is formed so as to bypass the radially outer through hole 32, and a radially outer end portion 123 is also bent radially from the inner connection coil main body 120. An inner connection coil extending portion 124 is formed at the radially outer end portion 123 of the inner connection coil 42a so as to extend axially outwards. Axial widths (L2) of the inner connection coil main body 120 and the radially inner end portion 122 are equal to a depth of the inner surface groove 38, and an axial width (L4) of the inner connection coil extending portion 124 is set at an axial width (2×L2+L3) that is equal to a sum of the depths of the outer surface groove 37 and the inner surface groove 38 and the thickness (L3) of the partition wall 31c. In addition, the fifteen inner connection coils 42b that are inserted into the inner surface grooves 38a basically have the same configuration as that of the inner connection coil 42a except that the inner connection coil main body 120 is formed so as to be curved into the same shape as that of the inner surface groove 38a. However, in the fifteen inner connection coils 42b, the input terminal portions 43 configured for connection to external equipment are formed integrally on the radially outer end portions 123 so as to fit in the input terminal notched portions 34c on the three inner connection coils 42b that are disposed in the positions corresponding to the input terminal notched portions 34c.

The outer connection coil 41 and the inner connection coil 42 have the same thickness (t1), and the thickness (t1) of the outer connection coil 41 and the inner connection coil 42 is set at a thickness that is the same as the thickness of the radially outer slot coil 26 and the radially inner slot coil 27 which have the same thickness. The thickness (t1) of the outer connection coil 41 and the inner connection coil 42 is smaller than the axial width (L2) of the outer connection coil 41 and the inner connection coil 42 (the outer connection coil main body 110 and the inner connection coil main body 120). The aforesaid "the axial width of x connection coils 40 (x=1, 2, 4)" means the axial width of the outer connection coil main body 110 and the inner connection coil main body 120. "Substantially equal" represents an expression including an error equaling the thickness of the partition wall 31c. The thickness of the insulation sheet 65 is not taken into consideration.

The outer connection coils 41, the inner connection coils 42 and the slot coils 25 can be formed into the desired axial widths and desired planar shapes by pressing and punching a metallic sheet (for example, a copper sheet) having a predetermined thickness (t1). Further, in the outer connection coil 41, by bending the pressed and punched sheet conductor, the outer connection coil main body 110 that is formed to extend along the involute curve having the same shape as that of the outer surface grooves 37, 37a, the radially inner end portion 111 and the radially outer end portion 112 that are connected from the outer connection coil main body 110 while being bent can be formed. Similarly, in the inner connection coil 42, by bending the pressed and punched sheet conductor, the inner connection coil main body 120 that is formed to extend along the involute curve having the same shape as that of the inner surface grooves 38, 38a, the radially inner end portion 122 and the radially outer end portion 123 that are connected from the inner connection coil main body 120 while being bent can be formed.

Figure 15:
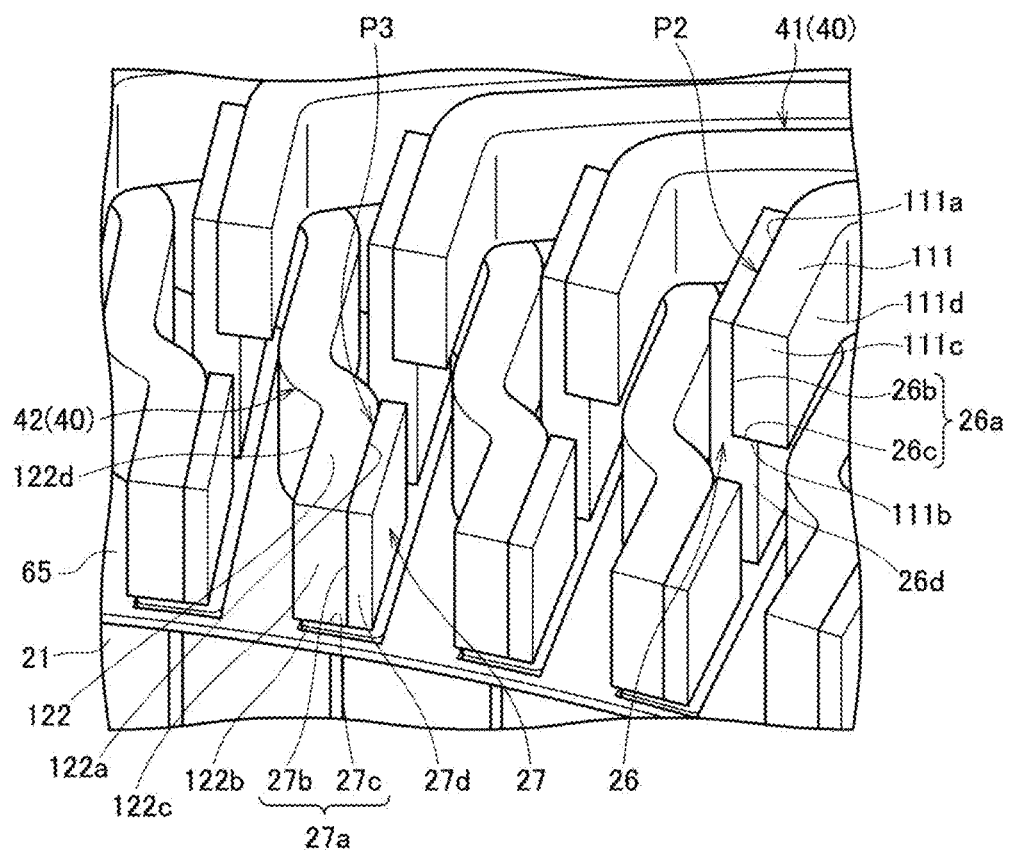
FIG. 15 is a perspective view illustrating the joining of a radially inner end portion of the outer connection coil and a step portion of a radially outer slot coil and the joining of a radially inner end portion of the inner connection coil and a step portion of a radially inner slot coil.

The outer connection coils 41a, 41b are inserted into the outer surface grooves 37, 37a of the base plates 31L, 31R, and are fixed by abutment with partition walls that define the outer surface grooves 37, 37a while extending from one circumferential direction to the other circumferential direction as seen from the outer surface 35. The radially inner end portions 111 of the outer connection coils 41 are disposed in the radially outer through holes 32 and are brought into abutment with the step portions 26a of the radially outer slot coils 26 that are inserted into the slots 23 in the stator core 21 and that are similarly disposed in the radially outer through holes 32 when assembling the stator core assembly 20 and the base plate assemblies 30L, 30R together, as shown in FIG. 15.

The inner connection coils 42a, 42b are inserted into the inner surface grooves 38, 38a of the base plates 31L, 31R, and are fixed by abutment with partition walls that define the outer surface grooves 37, 37a while extending from one circumferential direction to the other circumferential direction as seen from the inner surface 36. The radially inner end portions 122 of the inner connection coils 42a, 42b are disposed in the radially inner through holes 33 and are brought into abutment with the step portions 27a of the radially inner slot coils 27 that are inserted into the slots 23 in the stator core 21 and that are similarly disposed in the radially inner through holes 33 when assembling the stator core assembly 20 and the base plate assemblies 30L, 30R together, as shown in FIG. 15.

Figure 14:
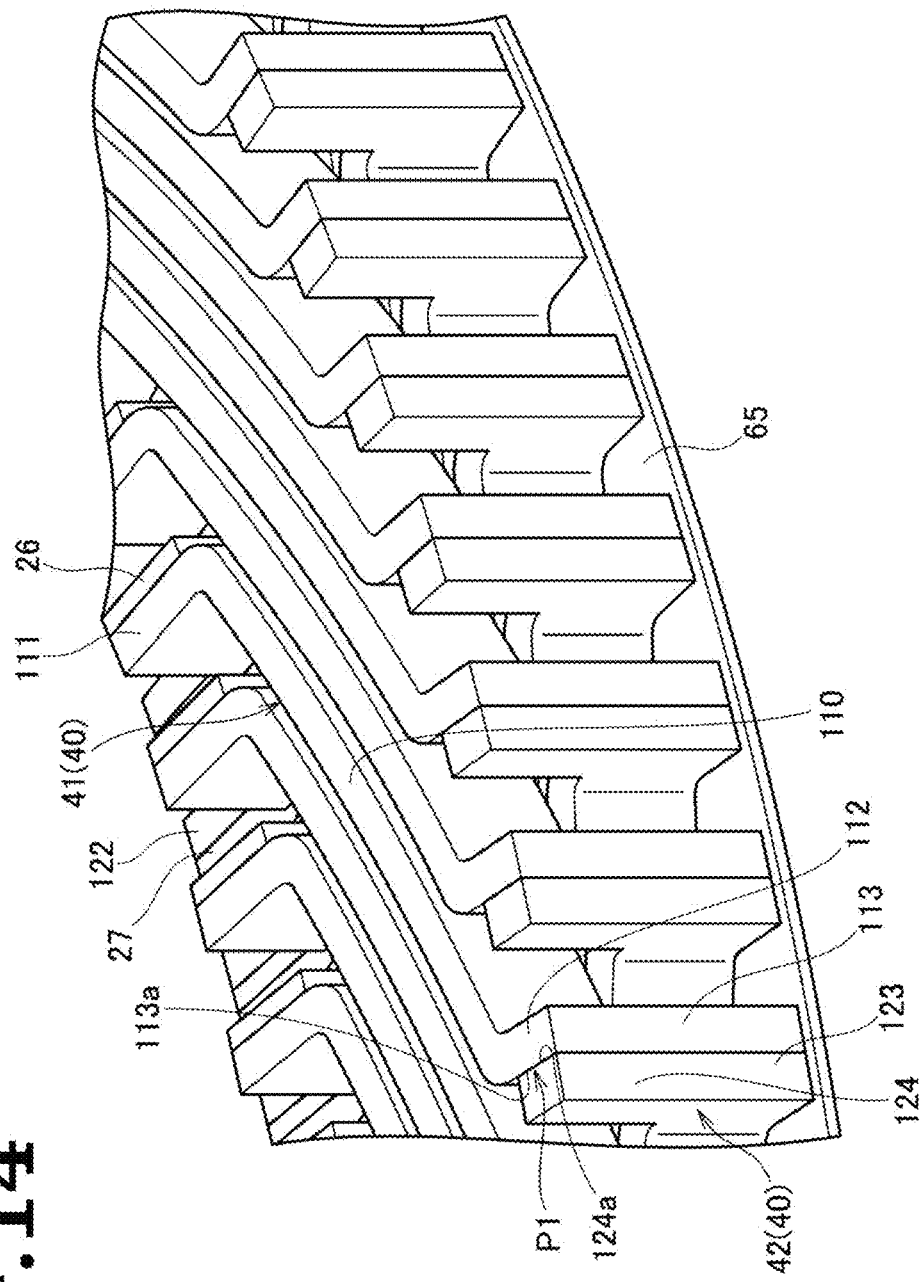
FIG. 14 is a perspective view illustrating the joining of an outer connection coil extending portion and an inner connection coil extending portion.

The radially outer end portions 112 of the outer connection coils 41a, 41b and the radially outer end portions 123 of the inner connection coils 42a, 42b are both disposed in the outer circumferential holes 34, whereby side surfaces 113a of the outer connection coil extending portions 113 that are oriented in the one circumferential direction and side surfaces 124a of the inner coil extending portions 124 that are oriented in the other circumferential direction are brought into abutment with each other over the whole surface in the radial and axial directions, as shown in FIG. 14.

[3 Joining]

The radially inner end portions 111 of the outer connection coils 41 and the step portions 26a of the radially outer slot coils 26 which are brought into abutment with each other, the radially inner end portions 122 of the inner connection coils 42 and the step portions 27a of the radially inner slot coils 27 which are brought into abutment with each other, and the outer connection coil extending portions 113 of the outer connection coils 41 and the inner connection coil extending portions 124 of the inner connection coils 42 which are brought into abutment with each other are joined together on planar plate surfaces thereof that intersect a thickness direction through welding, preferably through laser welding. In the following description, joining will be described as being carried out using laser welding.

As shown in FIG. 14, in the outer connection coil extending portions 113 and the inner connection coil extending portions 124, the side surfaces 113a of the outer connection coil extending portions 113 that are oriented in the one circumferential direction and the side surfaces 124a of the inner connection coil extending portions 124 that are oriented in the other circumferential direction are made to face each other for abutment, both of which are planar plate surfaces that intersect the thickness direction and which follow the axial direction, whereby the plate surfaces are brought into surface contact with each other over the whole surface in the radial and axial directions. With both the side surfaces 113a, 124a brought into surface contact with each other, laser welding is executed along abutment planes P1 that extend in the radial direction from axially outer sides of the outer circumferential holes 34, whereby the side surfaces 113a, 124a are joined together on the abutment planes P1. By adopting this configuration, the radially outer end portions 112 of the outer connection coils 41 and the radially outer end portions 123 of the inner connection coils 42 which are situated in the same outer circumferential holes 34 are electrically connected together, whereby the base plate assemblies 30L, 30R are made up. In FIG. 14, the base plates 31L, 31R are omitted. This will also be true in FIGS. 15 and 16 which will be described below.

Figure 16:
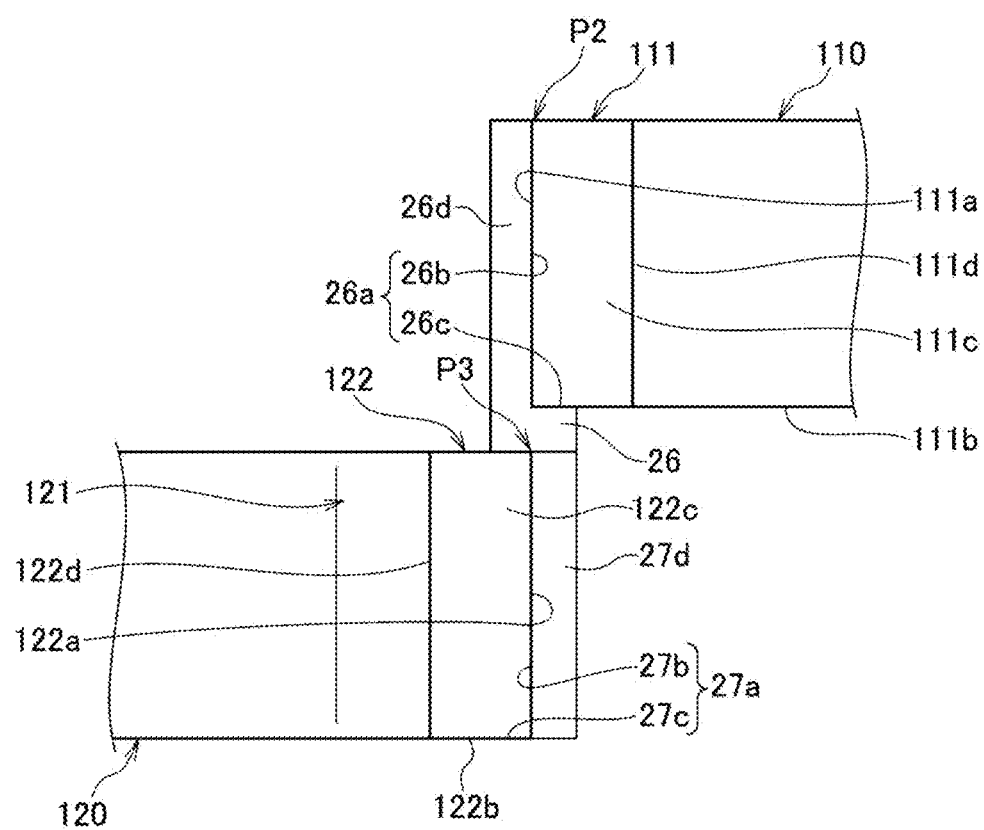
FIG. 16 is a view of one slot coil inserted into one of the slots shown in FIG. 15 as seen from a radially inner side.

As shown in FIGS. 15 and 16, in assembling together the stator core assembly 20 and the base plate assemblies 30L, 30R, the base plates 30L, 30R are assembled to the stator core assembly 20 in the axial direction with the insulation sheets 65 interposed therebetween while aligning the base plate assemblies 30L, 30R relatively with the stator core assembly 20 in the circumferential direction, whereby the radially inner end portions 111 of the outer connection coils 41 are brought into abutment with the step portions 26a of the radially outer slot coils 26 and the radially inner end portions 122 of the inner connection coils 42 are brought into abutment with the step portions 27a of the radially inner slot coils 27, whereby the stator core assembly 20 and the base plate assemblies 30L, 30R are positioned.

The step portion 26a of the radially outer slot coil 26 is made up of a side surface 26b that is a planar plate surface and which is oriented in the one circumferential direction and a bottom surface 26c, and a circumferential width of the bottom surface 26c is set at a length (t1/2) that is about half the thickness (t1) of the radially outer slot coil 26. In the radially inner end portion 111 of the outer connection coil 41 that is brought into abutment with the step portion 26a of the radially outer slot coil 26, a side surface 111a that is a planar flat surface and which is oriented in the other circumferential direction is brought into abutment with the side surface 26b of the step portion 26a over the whole surface, the bottom surface 111b is brought into abutment with the bottom surface 26c of the step portion 26a over the whole surface, and a radially inner end face 111c is brought into abutment with a radially inner end face 26d of the radially outer slot coil 26 so as to flush with the radially inner end face 26d. The thickness (t1) of the outer connection coil 41 is thicker than the circumferential width (t1/2) of the bottom surface 26c, and therefore, the side surface 111d of the outer connection coil 41 which is oriented in the other circumferential direction protrudes from the bottom surface 26c.

With both the planar side surfaces 111a, 26b that intersect the thickness direction and which follow in the axial direction brought into surface contact with each other, laser welding is executed along abutment planes P2 from axially outer sides of the radially outer through holes 32, whereby the side surfaces 111a, 26b are joined together on the abutment planes P2. In joining both the side surfaces together, the bottom surface 26c of the step portion 26a also functions to prevent the passage of a laser beam.

The step portion 27a of the radially inner slot coil 27 is made up of a side surface 27b that is a planar plate surface and which is oriented in the other circumferential direction and a bottom surface 27c, and a circumferential width of the bottom surface 27c is set at a length (t1/2) that is about half the thickness (t1) of the radially inner slot coil 27. In the radially inner end portion 122 of the inner connection coil 42 that is brought into abutment with the step portion 27a of the radially inner slot coil 27, a side surface 122a that is a planar flat surface and which is oriented in the one circumferential direction is brought into abutment with the side surface 27b of the step portion 27a over the whole surface, a bottom surface 122b is brought into abutment with the bottom surface 27c of the step portion 27a over the whole surface, and a radially inner end face 122c is brought into abutment with a radially inner end face 27d of the radially inner slot coil 27 so as to flush with the radially inner end face 27d. The thickness (t1) of the inner connection coil 42 is thicker than the circumferential width (t1/2) of the bottom surface 27c, and therefore, the side surface 122d of the inner connection coil 42 which is oriented in the one circumferential direction protrudes from the bottom surface 27c.

With both the planar side surfaces 122a, 27b that intersect the thickness direction and which follow in the axial direction brought into surface contact with each other, laser welding is executed along abutment planes P3 from axially outer sides of the radially inner through holes 33, whereby the side surfaces 122*a*, 27*b* are joined together on the abutment planes P3. In joining both the side surfaces together, the bottom surface 27*c* of the step portion 27*a* also functions to prevent the passage of a laser beam. The radially innermost portions 39 of the base plates 31L, 31R where the radially inner through holes 33 are formed are set at an axial width that corresponds to the depth of the inner surface grooves 38, 38*a*, and therefore, a laser gun does not have to be inserted deeply into the radially inner through holes 33.

Similarly, the step portions 26*a* of the radially outer slot coils 26 that are disposed in the radially outer through holes 32*a* where the busbar notched portions are formed and the busbar connecting portions of the busbars 61U, 61V, 61W that are disposed in the busbar notched portions are laser welded together, and the step portions 27*a* of the radially inner slot coils 27 that are disposed in the radially inner through holes 33*a* where the middle point busbar notched portions are formed and the middle point busbar connecting portions of the middle point busbars 62 are laser welded together, whereby the busbars 61U, 61V, 61W and the middle point busbars 62 are joined individually to the radially outer slot coils 26 and the radially inner slot coils 27.

Figure 17:
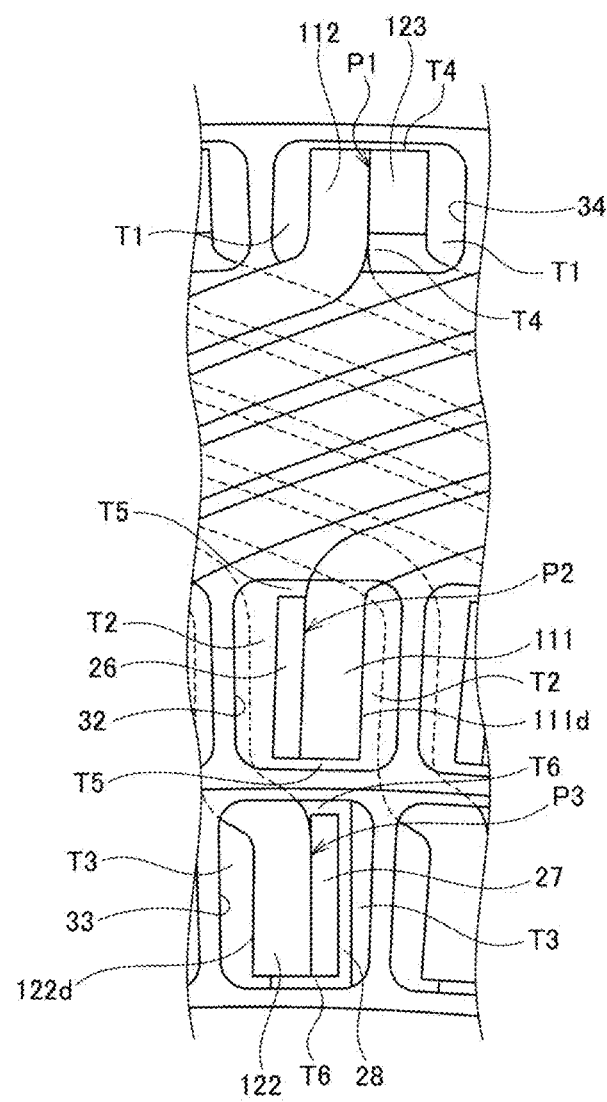
FIG. 17 is a partial enlarged view of FIG. 7A.

The radially outer through holes 32, 32*a*, the radially inner through holes 33, 33*a* and the outer circumferential holes 34 exhibit a rectangular shape as seen from the axial direction and have a space greater than the coil members (the radially outer slot coils 26, the radially inner slot coils 27, the outer connection coils 41, the inner connection coils 42, the busbar connecting portions, the middle point busbar connecting portions) that are disposed in interiors thereof. To describe this more specifically, as shown in FIG. 17, the outer circumferential hole 34 has a gap portion T1 individually at a circumferential side of a radially outer end portion 112 of the outer connection coil 41 and at a circumferential side of a radially outer end portion 123 of the inner connection coil 42, the radially outer through hole 32, 32*a* has a gap portion T2 individually at a circumferential side of the radially outer slot coil 26 and at a circumferential side of a radially inner end portion 111 of the outer connection coil 41, and the radially inner through hole 33, 33*a* has a gap portion T3 individually at a circumferential side of the radially inner slot coil 27 and at a circumferential side of the inner connection coil 42. Widths of the gap portions T1 to T3 are set so that temperatures of wall portions that define the individual holes become equal to or lower than the heat-resistant temperature of a resin of which the base plates 31L, 31R are made at the time of joining. The widths of the gap portions T1 to T3 are calculated from a joining temperature at a joining position and the heat-resistant temperature of the resin of which the base plates 31L, 31R are made.

In addition, the outer circumferential hole 34 has a gap portion T4 at both radial sides of an abutment plane P1 between the radially outer end portion 112 of the outer connection coil 41 and the radially outer end portion 123 of the inner connection coil 42, the radially outer through hole 32, 32*a* has a gap portion T5 at both circumferential sides of an abutment plane P2 between the radially outer slot coil 26 and the radially inner end portion 111 of the outer connection coil 41, and the radially inner through hole 33, 33*a* has a gap portion T6 at both circumferential sides of an abutment plane P3 between the radially inner slot coil 27 and the inner connection coil 42. Widths of the gap portions T4 to T6 are preferably set so that temperatures of wall portions that define the individual holes become equal to or lower than the heat-resistant temperature of the resin of which the base plates 31L, 31R are made at the time of joining. However, in the radial direction, the joining positions (the joining distances) on the abutment planes P1 to P3 may be adjusted in addition to the adjustment of the widths of the gap portions T4 to T6. In this way, the gap portions T1 to T6 are provided between the portions on to which a laser beam is shone and the base plates 31L, 31R, and therefore, it is possible to prevent the base plates 31L, 31R from being damaged by the laser beam.

By joining the constituent members together in the way described above, the base plate assemblies 30L, 30R are assembled to the stator core assembly 20 in such a state that the radially outer slot coils 26 and the radially inner slot coils 27 which are inserted into the slots 23 of the stator core 21 are electrically connected together via the outer connection coils 41 and the inner connection coils 42. The outer connection coils 41 and the inner connection coils 42 make up bridge portions of the coil 50 which connect the slot coils 25 of the same phase (for example, the U phase) together.

Figure 10:
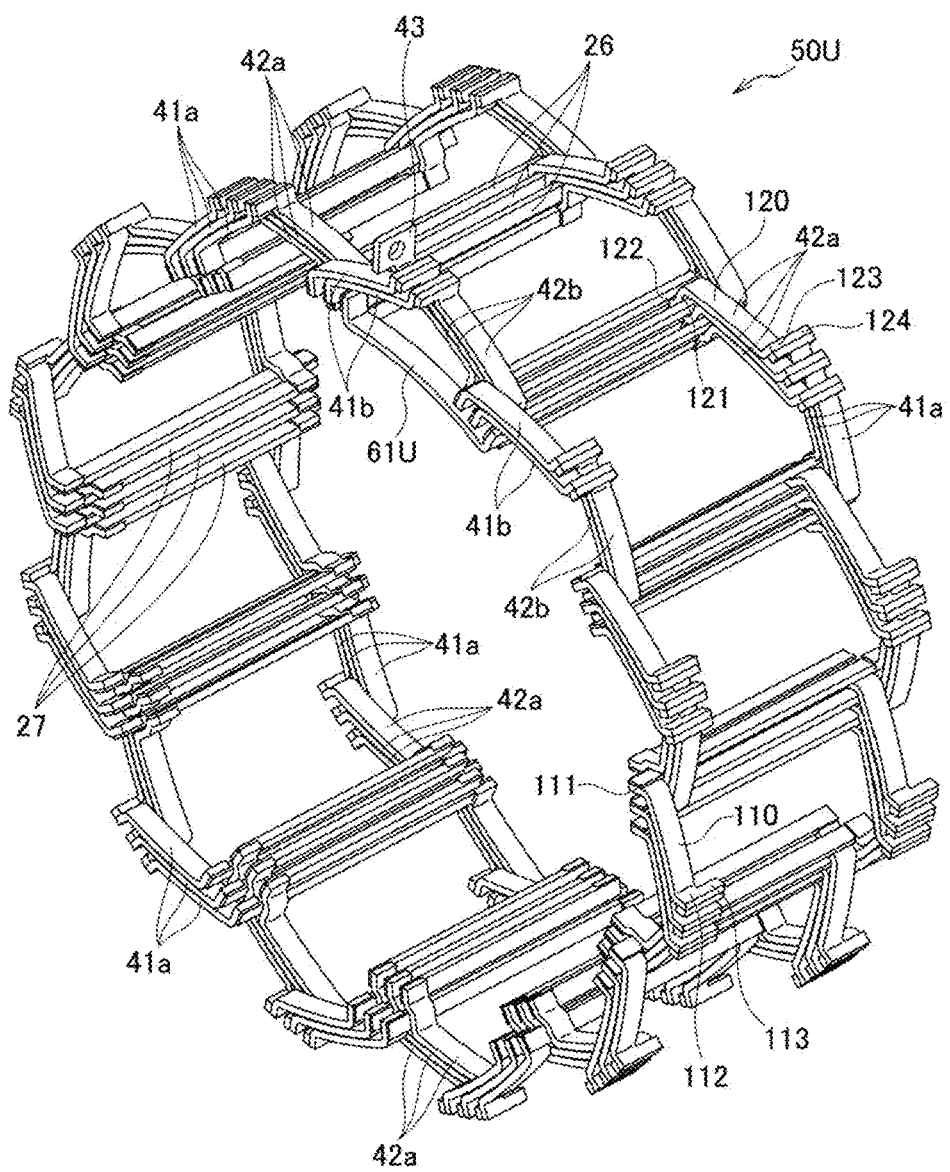
FIG. 10 is a perspective view of a coil of one phase that is taken out of the coils of the plurality of phases shown in FIG. 8.

Consequently, for example, as shown in FIG. 10, in relation to the radially outer slot coil 26 and the radially inner slot coil 27 which are disposed in the same slot 23, the outer connection coil 41 that is connected at one end (a near end in the figure) of the radially outer slot coil 26 extends radially outwards and clockwise to be connected to the inner connection coil 42 of the same phase, while the outer connection coil 41 that is connected at the other end (a far end in the figure) of the radially outer slot coil 26 extends radially outwards and counterclockwise to be connected to the inner connection coil 42 of the same phase. In addition, the inner connection coil 42 that is connected at one end (a near end in the figure) of the radially inner slot coil 27 extends radially outwards and counterclockwise to be connected to the outer connection coil 41 of the same phase, while the inner connection coil 42 that is connected to the other end (a far end in the figure) of the radially inner slot coil 27 extends radially outwards and clockwise to be connected to the outer connection coil 41 of the same phase.

Figure 8:
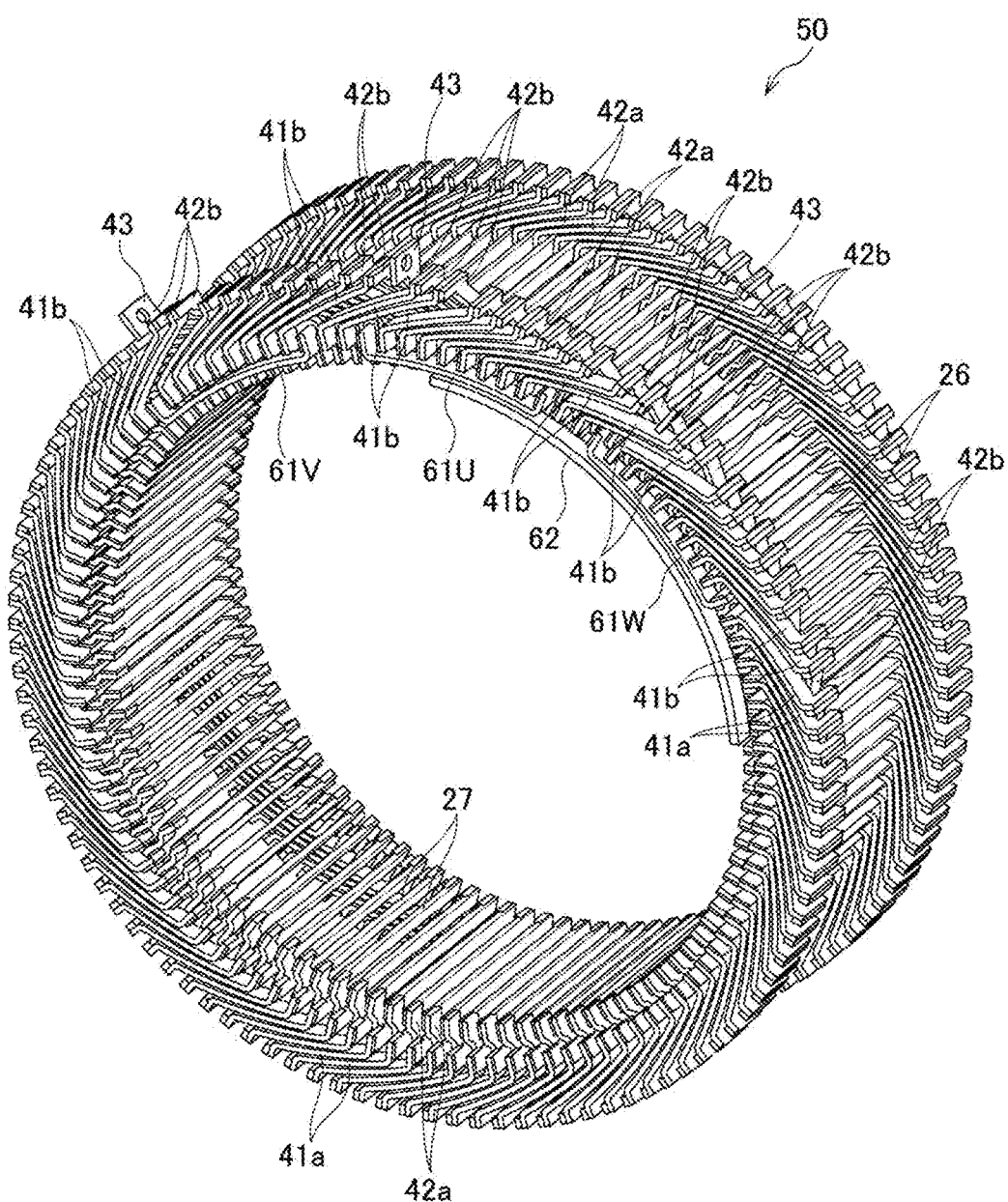
FIG. 8 is a perspective view of coils of a plurality of phases.
Figure 9:
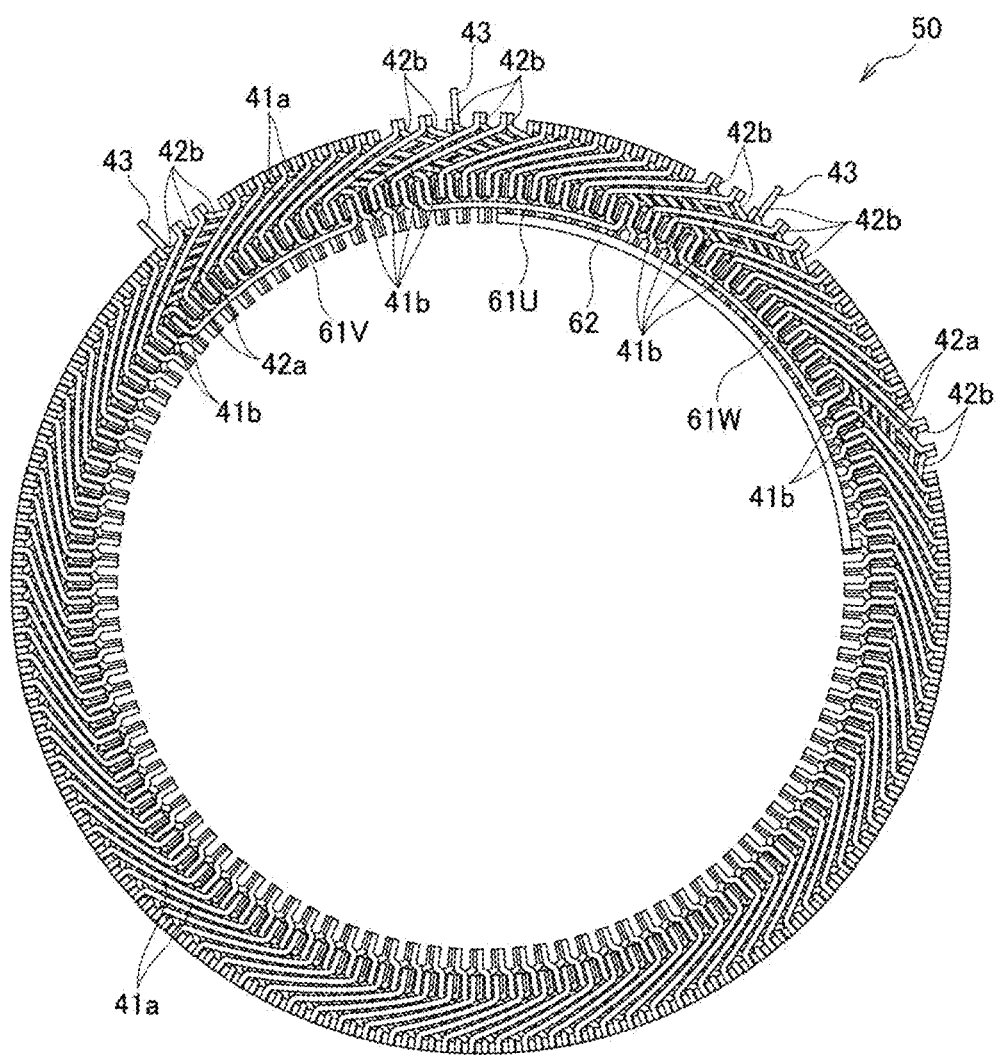
FIG. 9 is a front view of FIG. 8.

In this way, the stator 10 is made up by assembling the pair of base plate assemblies 30L, 30R to both the ends of the stator core assembly 20, whereby the segmented coil 50 forms six coil loops (U-phase coil 50U, V-phase coil 50V, W-phase coil 50W) having the same construction for each phase. In the six coil loops (U-phase coil 50U, V-phase coil 50V, W-phase coil 50W) for each phase, three sets of U-phase coils 50U, three sets of V-phase coils 50V, and three sets of W-phase coils 50W, each set being made up of two coil loops, are wound counterclockwise in this order through wave winding (refer to FIG. 11). FIG. 8 is a perspective view of the coils of the different phases showing the segmented coils of the plurality of phases (U, V, W phases) which are taken out of the stator 10 for the purpose of easy understanding, FIG. 9 is a front view of the FIG. 8, FIG. 10 is a perspective view of the coils of one phase (for example, U phase) which are further taken out of the coils of the plurality of phases, FIG. 11 is a development view showing a mode of connecting the U-phase coils, and FIG. 12 is a schematic diagram showing a mode of connecting the U-phase, V-phase and W-phase coils together.

A mode of connecting the coils of each phase or U phase, for example, will be described in greater detail by reference to FIG. 11. In the six coil loops that make up the U-phase coil, three coil loops (U loops) are continuously wound clockwise through wave winding, while three coil loops (U̅ loops) are continuously wound counterclockwise through wave winding, and the U loops and the U̅ loops are connected in series by the busbar 61U. The radially outer slot coil 26 and the radially inner slot coil 27 that are covered with the insulation material 28 and which are disposed in one slot 23 are made up of the coil that make up the U loop and the coil that make up the U loop, and an electric current flows in the same direction.

Figure 11:
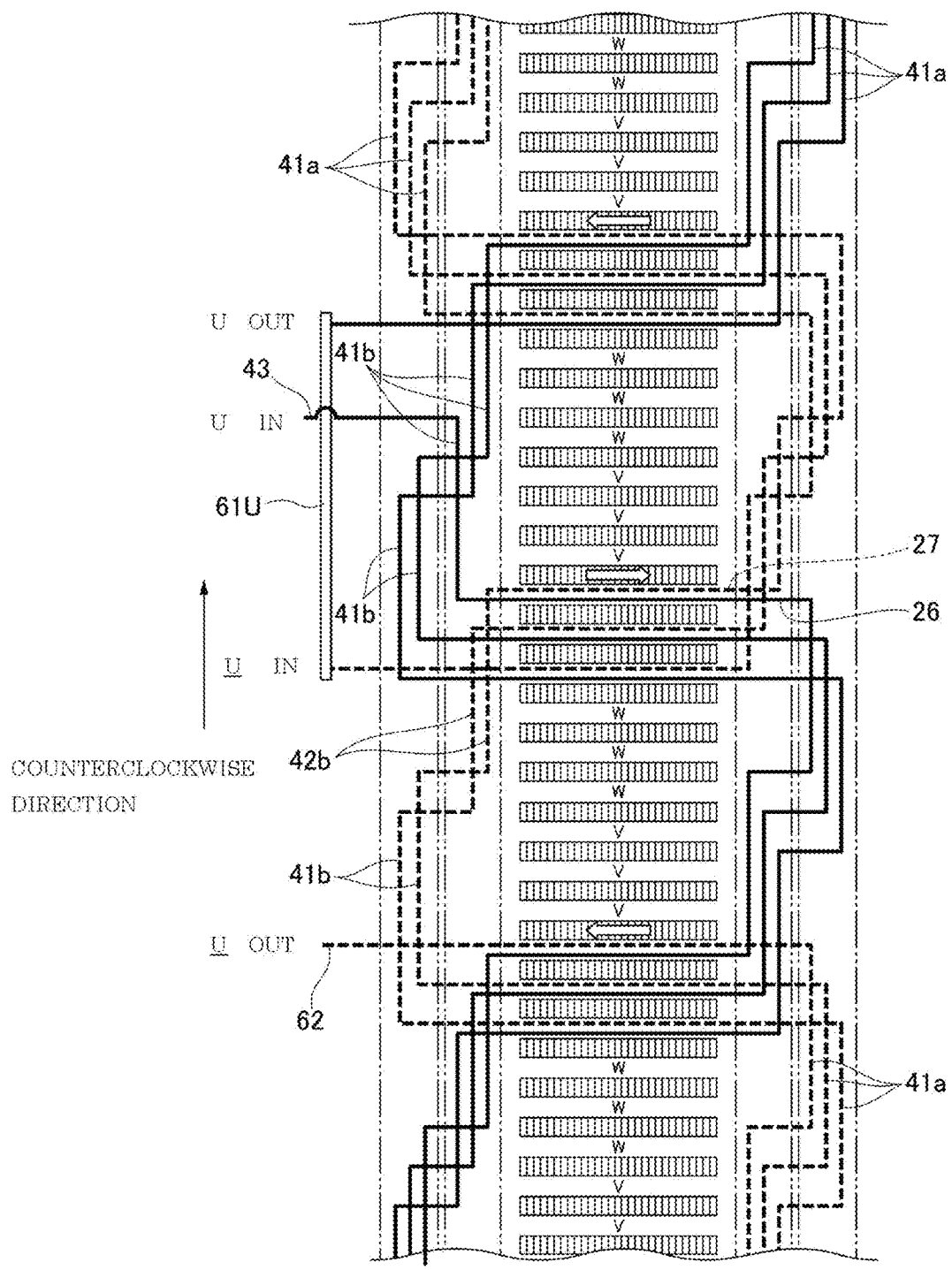
FIG. 11 is a development view showing a mode of connecting a U-phase coil.
Figure 12:
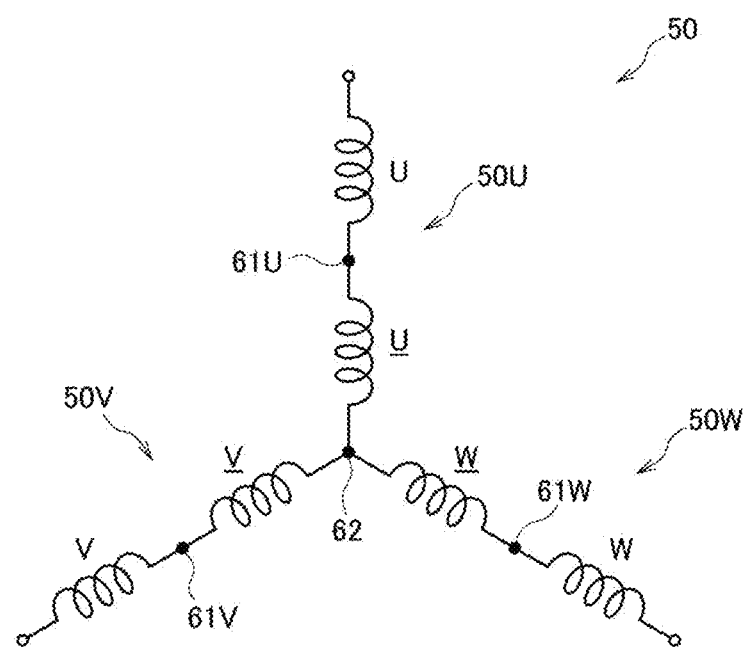
FIG. 12 is a schematic view showing a mode of connecting U-phase, V-phase and W-phase coils.

For example, when paying attention to one of the U loops, as shown in FIG. 11, the coil is connected from an axial end (a right-hand side in the figure) of the radially outer slot coil 26 that is disposed in the U-phase slot 23, and then connected through the outer connection coil 41 and the inner connection coil 42 in this order to the radially inner slot coil 27 in the next U-phase slot 23. Thereafter, the coil is connected from the other axial end (a left-hand side in the figure) of the radially inner slot coil 27, and then connected through the inner connection coil 42 and the outer connection coil 41 in this order to the radially outer slot coil 26 in the following U-phase slot 23. From this on, this connecting configuration is repeated to form the U loop.

Similarly, in six loops that make up one of the coils of the remaining another two phases, that is, the V-phase coil (the W-phase coil), too, three V loops (W loops) and three V loops (W loops) that are wound through wave winding in opposite directions are connected in series by the busbar 61V (the busbar 61W), and the radially outer slot coil 26 and the radially inner slot coil 27 that are disposed in one slot 23 are made up of the coil that make up the V loop (W loop) and the coil that make up the V loop (W loop), and an electric current flows in the same direction. The U-phase coil 50U, the V-phase coil 50V and the W-phase coil 50W are star connected at the middle point busbar 62 as shown in FIG. 12.

In the stator 10, the outer connection coil 41 and the inner connection coil 42 are disposed within an area produced by projecting the stator core 21 in the axial direction and are disposed in different positions in relation to the axial direction. In addition, outer surfaces of the plurality of outer connection coils 41a, 41b that are disposed axially outwards of the stator 10 flush with the end faces of the base plates 31L, 31R.

[4 Assembling]

Figure 18:
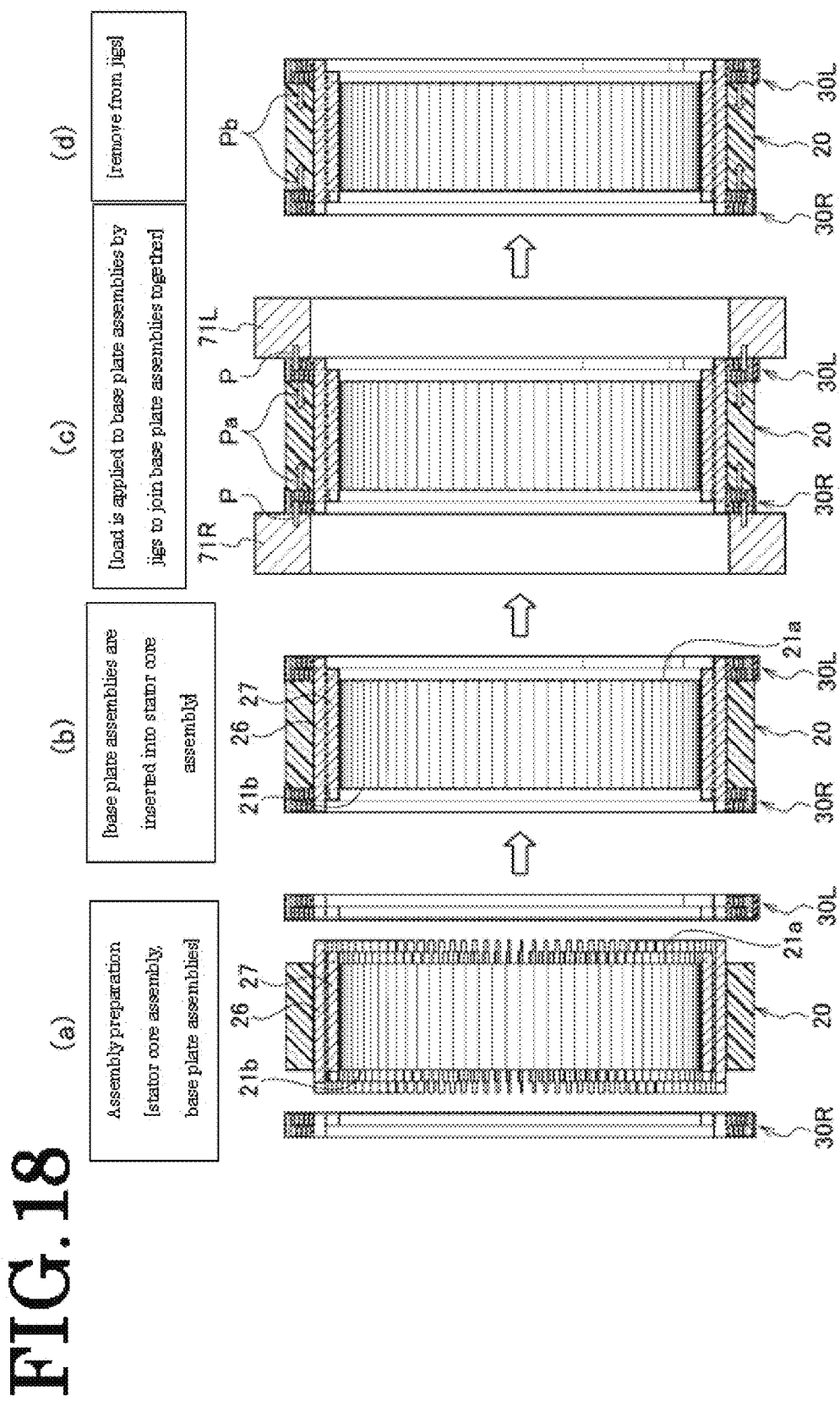
FIG. 18 is a vertical sectional view showing a fabrication method of the stator for an electric rotary machine of the first embodiment.

Referring to FIG. 18, the assembling of the stator core assembly 20 and the base plate assemblies 30L, 30R, which represents one step of the production process of the stator 10, will be described. Firstly, the base plate assemblies 30L, 30R are disposed to face each other with their phases aligned so that the radially outer slot coils 26 and the radially inner slot coils 27 that project from the end faces 21a, 21b of the stator core 21 are inserted into the radially outer through holes 32 and the radially inner through holes 33 of the base plate assemblies 30L, 30R (FIG. 18(a)).

Following this, the stator core assembly 20 and the base plate assemblies 30L, 30R are moved relatively in the axial direction and the radially outer slot coils 26 and the radially inner slot coils 27 are inserted into the radially outer through holes 32 and the radially inner through holes 33 of the base plate assemblies 30L, 30R (FIG. 18(b)). In this state, jigs 71L, 71R are brought into abutment with the base plate assemblies 30L, 30R, respectively, from their outer sides in the axial direction.

The jigs 71L, 71R apply a load P axially inwards to the base plate assemblies 30L, 30R, respectively (FIG. 18(c)). The load P that is applied to the base plate assemblies 30L, 30R from the jigs 71L, 71R is transmitted to the stator core assembly 20. As a result, the stator core assembly 20 is put in a state in which a load Pa is applied to the stator core assembly 20 from both axial sides thereof by way of the base plate assemblies 30L, 30R and the insulation sheets 65. By executing the joining through laser welding as described above in this state, the radially outer slot coils 26 that are inserted into the slots 23 of the stator core 21 and the outer connection coils 41 are connected together physically, and the radially inner slot coils 27 and the inner connection coils 42 are also connected together physically. Finally, the stator 10 to which the stator core assembly 20 and the base plate assemblies 30L, 30R are now assembled is removed from the jigs 71L, 71R (FIG. 18(d)).

As shown in FIG. 18(d), with the stator 10 removed from the jigs 71L, 71R, a load Pb is kept applied to the stator core 21 of the stator core assembly 20 from the base plates 31L, 31R of the base plate assemblies 30L, 30R. The load Pb is kept applied so because the reaction force generated by the spring properties of the stator core 21 that is made up of a plurality of silicone steel sheets that are laminated in the axial direction and the reaction force generated by the elasticity of the base plates 31L, 31R that are formed of resin are limited by the physical binding force resulting from the joining of the slot coils 25 (26, 27) and the connection coils 40 (41, 42) as described above.

In the description made above, the load P is applied by the jigs 71L, 71R in such a state that the stator core assembly 20 is sandwiched by the base plate assemblies 30L, 30R. However, the base plate assemblies 30L, 30R may be assembled to the stator core assembly 20 one at a time.

Thus, as has been described heretofore, according to the stator 10 for an electric rotary machine of this embodiment, the outer connection coil main bodies 110 and the inner connection coil main bodies 120 are brought into abutment with the base plates 31L, 31R in such a state that the outer connection coils 41 and the inner connection coils 42 are accommodated in the outer surface grooves 37 and the inner surface grooves 38 of the base plates 31L, 31R, whereby the connection coils 40 are fixed. Then, in the radially outer through holes 32, 32a and the radially inner through holes 33, 33a where the abutment planes P2, P3 are accommodated, the connection coils 40 (the outer connection coils 41 and the inner connection coils 42) and the slot coils 25 (the radially outer slot coils 26 and the radially inner slot coils 27) are spaced apart from the base plates 31L, 31R in the circumferential direction to thereby form the gap portions T2, T3. By doing so, in the abutment planes P2, P3, even in the event that the coils are joined together by applying heat through, for example, laser welding, it is possible to restrict the peripheral base plates 31L, 31R from being damaged by heat, thereby making it possible to suppress the reduction in insulation performance between the connection coils 40 (the outer connection coils 41 and the inner connection coils 42) in the base plates 31L, 31R.

In addition, in the hole portions 34 where the radially outer end portions 112 of the outer connection coils 41 and the radially outer end portions 123 of the inner connection coils 42, the inner connection coils 42 and the outer connection coils 41 are spaced apart from the base plates 31L, 31R in the circumferential direction to thereby form the gap portions T1, whereby it becomes possible to suppress the occurrence of damage to the peripheral base plates 31L, 31R by heat, thereby making it possible to suppress the reduction in insulation performance between the connection coils 40 (the outer connection coils 41 and the inner connection coils 42) in the base plates 31L, 31R.

In addition, the connection coils 40 are in abutment with the slot coils 25 from the circumferential direction at the abutment portions, and the abutment planes P2, P3 are exposed from the axial end faces of the base plates 31L, 31R. Thus, the connection coils 40 that are accommodated in the outer surface grooves 37 and the inner surface grooves 38 of the base plates 31L, 31R can easily be joined from the axially outer side of the radially outer through holes 32, 32a and the radially inner through holes 33, 33a of the base plates 31L, 31R.

Additionally, by providing the gap portions T1 to T3, in the event that a refrigerant is blown directly to the outer surfaces 35 of the base plates 31L, 31R in cooling, the surface areas of the coil with which the refrigerant is brought into direct contact becomes great, and therefore, it is possible to cool the coil efficiently.

According to the assembling method described above, the stator 10 can be realized in which the stator core assembly 20 and the base plate assemblies 30L, 30R are fixed by means of the load Pb that remains between the stator core 21 and the base plates 31L, 31R that are shown in FIG. 18(d). In the stator 10, the positions of the coil that includes the slot coils 25 and the connection coils 40, the stator core 21 and the base plates 31L, 31R are restricted from deviating relatively, and therefore, it is possible to suppress the wear of the insulating members that would otherwise be caused by vibrations generated when the electric rotary machine is driven. As a result, it is possible to suppress the reduction in insulation performance of the stator 10. In the insulating members include the base plates 31L, 31R, the insulation sheets 65 and the insulating members 28 of the slot coils 25.

In addition, no thermosetting resin such as varnish is used in producing the stator 10 of this embodiment, and therefore, it is possible to produce the stator 10 with good efficiency.

Figure 19:
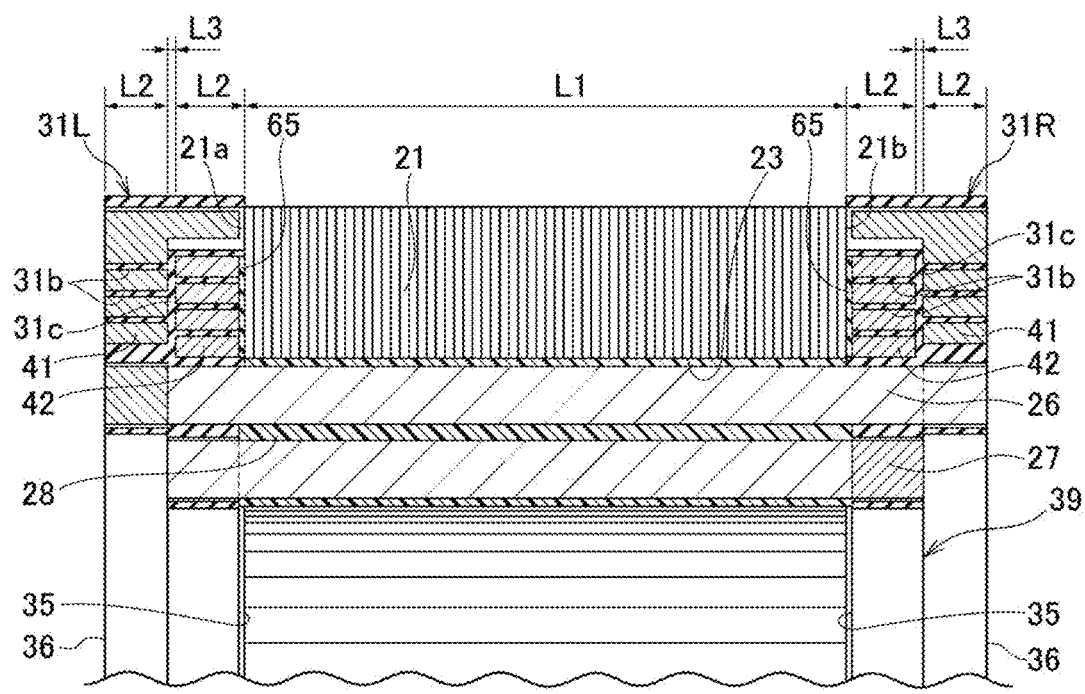
FIG. 19 is a vertical sectional view showing part of a modified example made to the stator shown in FIG. 1.

In addition, as shown in FIG. 19, a configuration may be adopted in which part of the walls 31b and the outer circumferential walls of the base plates 31L, 31R are brought into direct abutment with the stator core 21. According to this configuration, a state can be realized in which the load Pb is applied directly to the stator core 21 from the base plates 31L, 31R while realizing the insulation between the stator core 21 and the connection coils 41, 42 by the insulation sheets 65. Further, no load is applied to the insulation sheets 65, and therefore, an insulation sheet whose strength is low can be used as the insulation sheets 65.

Second Embodiment

Next, a stator for an electric rotary machine of a second embodiment will be described. The stator for an electric rotary machine of the second embodiment has the same or similar configurations to those of the first embodiment except for a configuration in which step portions 26a, 27a of radially outer slot coils 26 and radially inner slot coils 27 which make up slot coils 25 are disposed differently, and therefore, in the following description, different portions will mainly be described, and the description of portions having the same or similar configurations to those of the first embodiment will be omitted.

Figure 20A:
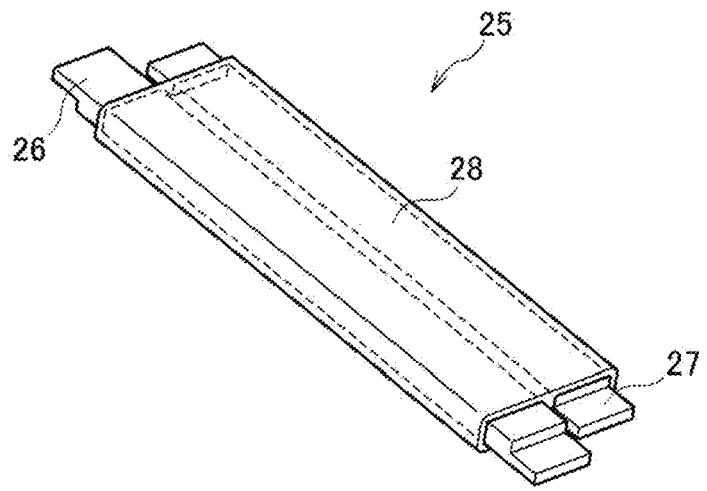
FIG. 20A is a perspective view of a slot coil according to a second embodiment.
Figure 20B:
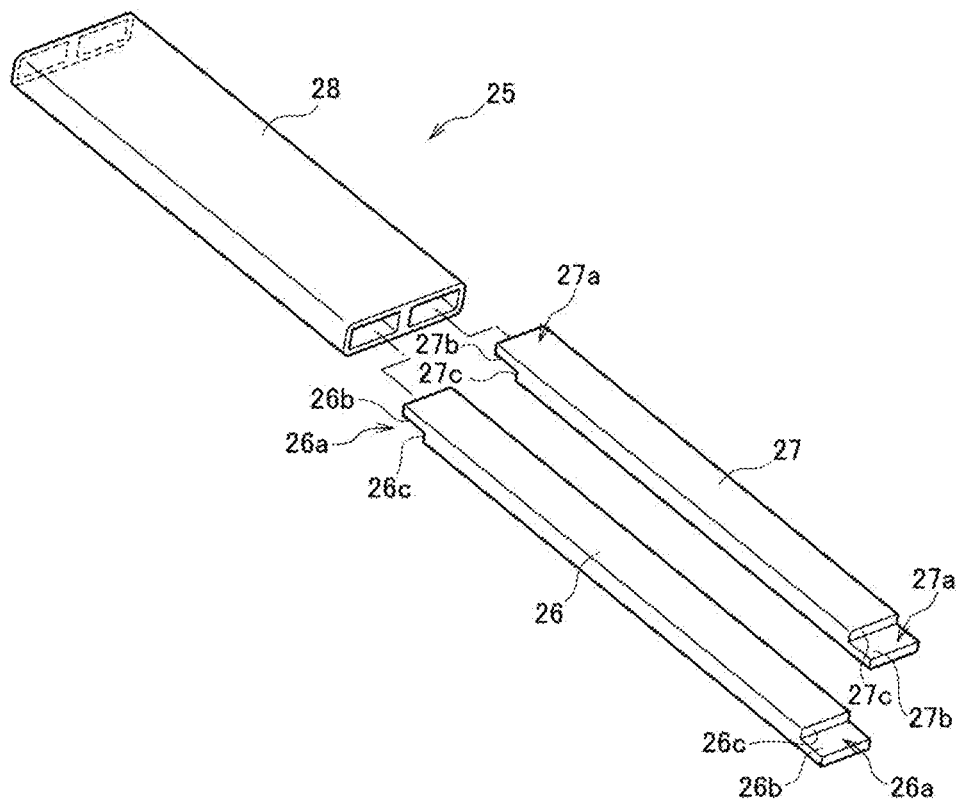
FIG. 20B is an exploded perspective view of the slot coil according to the second embodiment.

In this embodiment, as shown in FIGS. 20A and 20B, the step portions 26a, 27a are formed at both distal end portions of the radially outer slot coil 26 and the radially inner slot coil 27 so as to be directed in the same circumferential direction. Namely, at one axial end portion of the radially outer slot coil 26, a surface oriented in one circumferential direction is cut out by a length (L2) equaling the axial width of one connection coil 40 in a step-like fashion so as to reduce a thickness of the one axial end portion, whereby a step portion 26a is formed on the one axial end portion, while at the other axial end portion of the radially outer slot coil 26, a surface oriented in the other circumferential direction is cut out by the length (L2) equaling the axial width of one connection coil 40 in a step-like fashion so as to reduce a thickness of the other axial end portion, whereby a step portion 26a is formed on the other axial end portion. In addition, at one axial end portion of the radially inner slot coil 27, a surface oriented in one circumferential direction is cut out by a length (L2) equaling the axial width of one connection coil 40 in a step-like fashion so as to reduce a thickness of the one axial end portion, whereby a step portion 27a is formed on the one axial end portion, while at the other axial end portion of the radially inner slot coil 27, a surface oriented in the other circumferential direction is cut out by the length (L2) equaling the axial width of one connection coil 40 in a step-like fashion so as to reduce a thickness of the other axial end portion, whereby a step portion 27a is formed on the other axial end portion.

Figure 21:
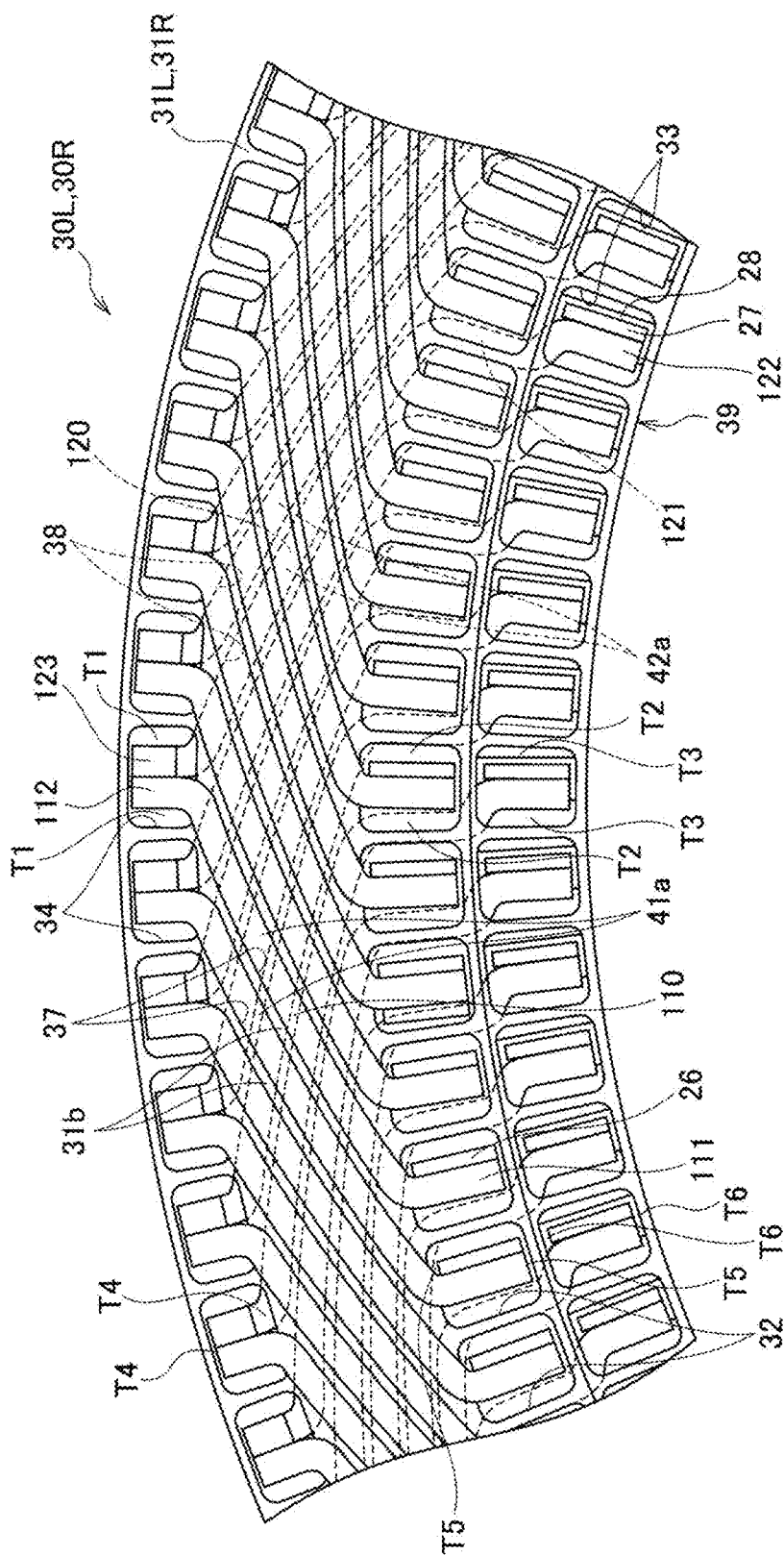
FIG. 21 is a front view showing part of a base plate assembly of the second embodiment.

Consequently, as shown in FIG. 21, radially inner end portions 111 of outer connection coils 41 and radially inner end portions 122 of inner connection coils 42 are brought into abutment with the step portions 26a, 27a of the radially outer slot coils 26 and the radially inner slot coils 27 from the same circumferential direction (from the left in FIG. 21).

Even in this case, outer circumferential holes 34 each have a gap portion T1 individually at a circumferential side of a radially outer end portion 112 of the outer connection coil 41 and at a circumferential side of a radially outer end portion 123 of the inner connection coil 42, radially outer through holes 32, 32a each have a gap portion T2 individually at a circumferential side of the radially outer slot coil 26 and at a circumferential side of a radially inner end portion 111 of the outer connection coil 41, and radially inner through holes 33, 33a each have a gap portion T3 individually at a circumferential side of the radially inner slot coil 27 and at a circumferential side of the inner connection coil 42.

In addition, the outer circumferential hole 34 has a gap portion T4 at both radial sides of an abutment plane P1 between the radially outer end portion 112 of the outer connection coil 41 and the radially outer end portion 123 of the inner connection coil 42, the radially outer through hole 32, 32a has a gap portion T5 at both circumferential sides of an abutment plane P2 between the radially outer slot coil 26 and the radially inner end portion 111 of the outer connection coil 41, and the radially inner through hole 33, 33a has a gap portion T6 at both circumferential sides of an abutment plane P3 between the radially inner slot coil 27 and the inner connection coil 42.

Consequently, even in the event that the coils are joined together by applying heat through, for example, laser welding, like the first embodiment, it is possible to restrict peripheral base plates 31L, 31R from being damaged by heat, thereby making it possible to suppress the reduction in insulation performance between the connection coils 40 in the base plates 31L, 31R.

Figure 22:
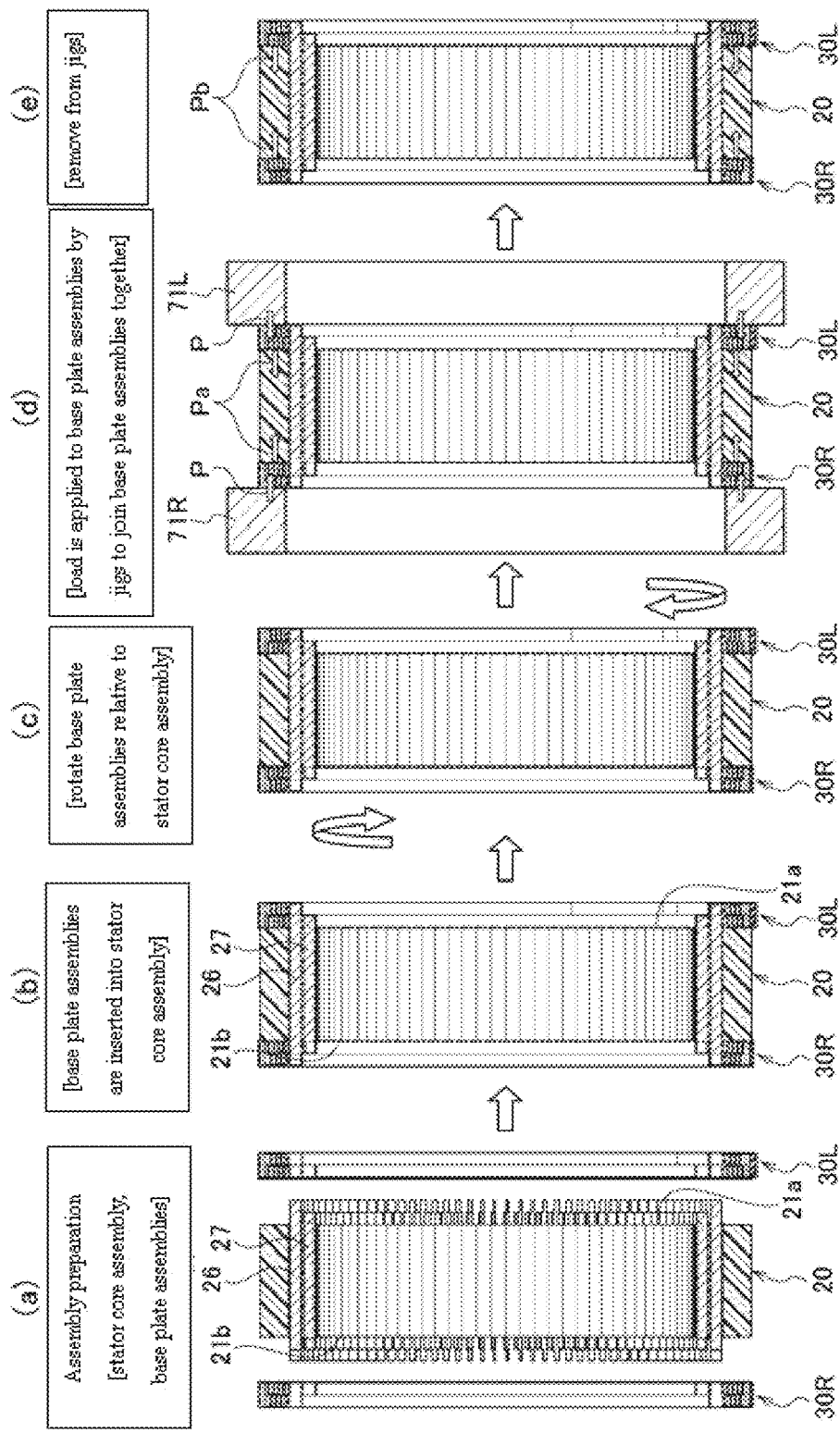
FIG. 22 shows vertical sectional views showing a fabrication method of the stator for an electric rotary machine of the second embodiment.

Further, according to the stator 10 for an electric rotary machine of the second embodiment, in assembling a stator core assembly 20 and base plate assemblies 30L, 30R, the following advantage is provided. This advantage will be described by reference to FIGS. 21 and 22 by taking the assembling of the stator core assembly 20 and the base plate assembly 30R as an example.

In assembling the stator core assembly 20 and the base plate assemblies 30L, 30R, firstly, the base plate assemblies 30L, 30R are disposed to face each other with their phases aligned so that the radially outer slot coils 26 and the radially inner slot coils 27 that project from end faces 21a, 21b of a stator core 21 of the base plate assembly 30R are inserted into the radially outer through holes 32 and the radially inner through holes 33 of the base plate assemblies 30L, 30R (FIGS. 22(a) and 23(a)).

Following this, the stator core assembly 20 and the base plate assemblies 30L, 30R are moved relatively in the axial direction and the radially outer slot coils 26 and the radially inner slot coils 27 are inserted into the radially outer through holes 32 and the radially inner through holes 33 of the base plate assemblies 30L, 30R (FIGS. 22(b) and 23(b)). In this state, side surfaces 111a, 26b of the radially inner end portions 111 of the outer connection coils 41 and the step portions 26a of the radially outer slot coils 26 are spaced apart from each other in the circumferential direction, and side surfaces 122a, 27b of the radially inner end portions 122 of the radially inner connection coils 42 and the step portions 27a of the radially inner slot coils 27 are also spaced apart from each other in the circumferential direction. A circumferential position of the radially inner end portion 111 of the outer connection coil 41 relative to the step portion 26a of the radially outer slot coil 26 and a circumferential position of the radially inner end portion 122 of the inner connection coil 42 relative to the step portion 27a of the radially inner slot coil 27 are in the same direction and at the same angle.

From this state, the stator core assembly 20 and the base plate assemblies 30L, 30R are rotated relatively clockwise direction in the circumferential direction as viewed from an outer side to an inner side in the axial direction so that the side surfaces 111a, 26b of the radially inner end portions 111 of the outer connection coils 41 and the step portions 26a of the radially outer slot coils 26 are brought into abutment with each other and that the side surfaces 122a, 27b of the radially inner end portions 122 of the inner connection coils 42 and the step portions 27a of the radially inner slot coils 27 are brought into abutment with each other (FIGS. 22(c) and 23(c)). In this state, jigs 71L, 71R are brought into abutment with the base plate assemblies 30L, 30R, respectively, from their outer sides in the axial direction.

The jigs 71L, 71R apply a load P axially inwards to the base plate assemblies 30L, 30R, respectively (FIG. 22(d)). The load P that is applied to the base plate assemblies 30L, 30R from the jigs 71L, 71R is transmitted to the stator core assembly 20. As a result, the stator core assembly 20 is put in a state in which a load Pa is applied to the stator core assembly 20 from both axial sides thereof by way of the base plate assemblies 30L, 30R and the insulation sheets 65.

Then, a surface contact pressure is generated between the side surfaces 111a, 26b of the radially inner end portions 111 of the outer connection coils 41 and the step portions 26a of the radially outer slot coils 26 and between the side surfaces 122a, 27b of the radially inner end portions 122 of the inner connection coils 42 and the step portions 27a of the radially inner slot coils 27. Further, with a load Pa applied to the base plate assemblies 30L, 30R from both the axial sides thereof, a laser welding is executed on the stator core assembly 20 along the abutment planes P2 from the axially outer side of the radially outer through holes 32, whereby the outer connection coils 41 and the radially outer slot coils 26 are joined together at the abutment planes P2. Likewise, a laser welding is executed on the stator assembly 20 along the abutment planes P3 from the axially outer side of the radially inner through holes 33, whereby the inner connection coils 42 and the radially inner slot coils 27 are joined together at the abutment planes P3 (FIGS. 22(d) and 23(d)). Finally, the stator 10 to which the stator core assembly 20 and the base plate assemblies 30L, 30R are now assembled is removed from the jigs 71L, 71R (FIG. 22(e)). It should be noted that the base plate assemblies 30L, 30R may be assembled to the stator core assembly 20 one at a time.

In joining, whether or not the connection coils 40 (the outer connection coils 41, the inner connection coils 42) and the slot coils 25 (the radially outer slot coils 26 and the radially inner slot coils 27) are brought into abutment with each other to thereby generate a surface contact pressure can be confirmed by detecting an applied torque on the equipment side that rotates the base plate assemblies 30L, 30R. In addition, it is preferable that the abutment planes P2, P3 are disposed so as to coincide with an imaginary line Q that extends in a radial direction from the axis center O of the stator 10. By doing so, the plate conductors can be brought into abutment with each other over a wide area, and therefore, not only can the joining strength be improved, but also the increase in contact resistance can be suppressed.

Additionally, like the first embodiment, as shown in FIG. 22(e), even with the stator 10 removed from the jigs 71L, 71R, a load Pb is kept applied to the stator core 21 of the stator core assembly 20 from the base plates 31L, 31R of the base plate assemblies 30L, 30R.

Thus, as has been described heretofore, according to the stator 10 for an electric rotary machine of this embodiment, in addition to the advantageous effect provided by the first embodiment, the outer connection coils 41 and the inner connection coils 42 are in abutment with the radially outer slot coils 26 and the radially inner slot coils 27 at the abutment planes P2, P3 from the same direction in relation to the circumferential direction. Thus, both the outer connection coils 41 and the inner connection coils 42 can be brought into abutment with both the radially outer slot coils 26 and the radially inner slot coils 27 by rotating the base plate assemblies 30L, 30R in the circumferential direction.

In addition, by joining the radially inner end portions 111 of the outer connection coils 41 and the step portions 26a of the radially outer slot coils 26 together with the surface contact pressure generated between the respective side surfaces 111a, 26b thereof and joining the radially inner end portions 122 of the inner connection coils 42 and the step portions 27a of the radially inner slot coils 27 together with the surface contact pressure generated between the respective side faces 122a, 27b thereof, even in the event that there exists a predetermined tolerance in position of the plurality of slot coils 25 (the radially outer slot coils 26, the radially inner slot coils 27) or the plurality of connection coils 40 (the outer connection coils 41, the inner connection coils 42), it is possible to suppress the occurrence of a contact failure that would otherwise be caused by the tolerance.

Additionally, the load Pb remains in the stator 10, and therefore, the positions of the coil that includes the slot coils 25 and the connection coils 40, the stator core 21 and the base plates 31L, 31R are restricted from deviating relatively. Owing to this, it is possible to suppress the wear of the insulating members that would otherwise be caused by vibrations generated when the electric rotary machine is driven, as a result of which the reduction in insulation performance of the stator 10 can be suppressed. In the insulating members include the base plates 31L, 31R, the insulation sheets 65 and the insulating members 28 of the slot coils 25.

In addition, no thermosetting resin such as varnish is used in producing the stator 10 of this embodiment, and therefore, it is possible to produce the stator 10 with good efficiency.

The invention is not limited to the embodiment which has been described heretofore and hence can be modified or improved as required.

For example, in the embodiment, while the stator of triple slot type is illustrated in which the coils of the same phase are disposed in every three slots that lie adjacent to one another in the circumferential direction, the invention is not limited to this configuration. Thus, a stator of single slot type in which coils of different phases are disposed individually and sequentially in slots that are arranged in the circumferential direction or a stator of double slot type in which coils of the same phase are disposed in every two slots that lie adjacent to each other in the circumferential direction may be used.

The form of connecting the coils is not limited to the one described in the embodiment. Thus, arbitrary specifications can be selected, and a direct connection and a parallel connection can also be selected as required.

In addition, an insulating cover may be disposed axially outwards of the pair of base plate assemblies 30L, 30R, and they may be covered with a resin or the like.

This patent application is based on Japanese Patent Application (Nos. 2014-072870 and 2014-072871) filed on Mar. 31, 2014, the contents of which are incorporated herein by reference.

DESCRIPTION OF REFERENCE NUMERALS AND CHARACTERS 10 stator for an electric rotary machine
20 stator core assembly
21 stator core
21a, 21b axial end face of stator core
23 slot
25 slot coil
26 radially outer slot coil
27 radially inner slot coil
30L, 30R base plate assembly
31L, 31R base plate (insulation plate)
32 radially outer through hole (hole portion)
33 radially inner through hole (hole portion)
34 outer circumferential hole (other hole portion)
35 outer surface (axial end face of insulation plate)
37 outer surface groove (accommodating portion)
38 inner surface groove (accommodating portion)
40 connection coil
41, 41a, 41b outer connection coil
42, 42a, 42b inner connection coil
50 coil
65 insulation sheet
71L, 71R jig
110 outer connection coil main body (connection coil main body)
120 inner connection coil main body (connection coil main body)
P2, P3 abutment plane (abutment portion)
T1 gap portion (second gap portion)
T2, T3 gap portion (first gap portion)
O axis center of stator
Q imaginary line

The invention claimed is:

1. A stator for an electric rotary machine comprising:
a stator core, which has plural slots; and
a coil, which is attached to the stator core, wherein:
the coil has plural slot coils and plural connection coils, each slot coil being inserted into the slot, each connection coil connecting the slot coils in a position lying further axially outwards than an axial end face of the stator core, and the coil being constituted in such a way that the slot coil and the connection coil are joined at an abutment portion;
the connection coil is accommodated in an accommodating portion, which is provided in an insulation plate that is made of an insulation material and that is disposed outwards of the axial end face of the stator core;
the connection coil is such that a connection coil main body extends from one side to an other side in a circumferential direction;
the connection coil main body abuts against the insulation plate in such a state that the connection coil is accommodated in the accommodating portion; and
in a hole portion, where the abutment portion is accommodated, of the insulation plate, the connection coil and the slot coil are spaced apart from the insulation plate in the circumferential direction to thereby form a first gap portion.

2. The stator for an electric rotary machine according to claim 1, wherein:
the connection coil is in abutment with the slot coil from the circumferential direction at the abutment portion; and
the abutment portion is exposed from an axial end face of the insulation plate as viewed from an axial direction.

3. The stator for an electric rotary machine according to claim 1, wherein:
the connection coil comprises an inner connection coil and an outer connection coil that are disposed in different axial positions;
the inner connection coil and the outer connection coil are joined individually to the slot coils at the abutment portions; and
the inner connection coil and the outer connection coil are in abutment with the slot coils from a same direction in the circumferential direction at the abutment portions.

4. The stator for an electric rotary machine according to claim 3, wherein:
the inner connection coil and the outer connection coil are joined to each other at an inner and outer connection coils abutment portion; and
in an another hole portion where the inner and outer connection coils abutment portion is accommodated, the inner connection coil and the outer connection coil are spaced apart from the insulation plate in the circumferential direction to thereby form a second gap portion.

5. The stator for an electric rotary machine according to claim 2, wherein
the connection coil and the slot coil are joined together in such a state that a surface contact pressure is generated between the connection coil and the slot coil at the abutment portion.

6. The stator for an electric rotary machine according to claim 1, wherein:
the slot coil and the connection coil are each made up of a plate conductor; and
the abutment portion is disposed so as to coincide with an imaginary line that extends in a radial direction from an axis center of the stator.

7. The stator for an electric rotary machine according to claim 1, wherein
the slot coil and the connection coil are joined together in such a state that the insulation plate that accommodates therein the connection coil is pressed toward an axially inner side against the stator core into which the slot coils are inserted.

8. The stator for an electric rotary machine according to claim 7, wherein:
the slot coil and the connection coil are joined together in such a state that the insulation plate that accommodates therein the connection coil, and the connection coil are pressed toward the axially inner side against the stator core into which the slot coils are inserted.

9. The stator for an electric rotary machine according to claim 7, wherein:
the insulation plate includes a pair of insulation plates that are provided on both axially outer end faces of the stator core; and
the slot coil and the connection coil are joined together in such a state that the pair of insulation plates are individually pressed toward axially inner sides with the stator core held therebetween.

10. The stator for an electric rotary machine according to claim 7, wherein:
the stator includes an insulation sheet between the stator core and the connection coil that is accommodated in the insulation plate; and
the insulation plate is in abutment with the axial end face of the stator core on a part of a surface of the insulation plate that faces the stator core.

11. The stator for an electric rotary machine according to claim 7, wherein
the abutment portion is disposed on an inner circumferential side of the insulation plate.

12. A method for producing a stator for the electric rotary machine according to claim 1, the method comprising:
an abutment step of bringing the connection coil and the slot coil into abutment with each other from the circumferential direction at the abutment portion; and
a joining step of joining the abutment portion that is exposed from an axial end face of the insulation plate from an axially outer side of the hole portion.

13. The method for producing a stator for an electric rotary machine according to claim 12, wherein
in the joining step, the abutment portion is joined in such a state that a surface contact pressure is applied to the connection coil and the slot coil.

14. The method for producing a stator for an electric rotary machine according to claim 12, wherein:
the connection coil each includes an inner connection coil and an outer connection coil that are disposed in different axial positions;
the inner connection coil and the outer connection coil are individually brought into abutment with the slot coils from a same direction in the circumferential direction at the abutment portions by rotating the insulation plate and the stator core relatively; and
in the joining step, the abutment portions are joined in such a state that a surface contact pressure is applied to the inner connection coil and the outer connection coil, and the slot coils.

15. The method for producing a stator for an electric rotary machine according to claim 12, wherein:
the method further comprises a pressing step of pressing the insulation plate that accommodates therein the connection coil toward an axially inner side against the stator core into which the slot coils are inserted; and
in the joining step, the abutment portion is joined in such a state that the insulation plate is pressed against the stator core.

16. The method for producing a stator for an electric rotary machine according to claim 15, wherein
in the pressing step, the insulation plate that accommodates therein the connection coil, and the connection coil are pressed toward the axially inner side against the stator core into which the slot coils are inserted.

17. The method for producing a stator for an electric rotary machine according to claim 15, wherein:
the insulation plate comprises a pair of insulation plates that are provided on both axially outer end faces of the stator core; and
in the pressing step, the pair of insulation plates individually press toward axially inner sides with the stator core held therebetween.

* * * * *